US008434129B2

(12) United States Patent (10) Patent No.: US 8,434,129 B2
Kannappan et al. (45) Date of Patent: Apr. 30, 2013

(54) METHOD AND APPARATUS FOR MULTI-DOMAIN IDENTITY INTEROPERABILITY AND COMPLIANCE VERIFICATION

(75) Inventors: Lakshmanan Kannappan, Sunnyvale, CA (US); Vijay S. Simha, Sunnyvale, CA (US); Hemma Prafullchandra, Mountain View, CA (US)

(73) Assignee: Fugen Solutions, Inc., Sunnyvale, CA (US)

( * ) Notice: Subject to any disclaimer, the term of this patent is extended or adjusted under 35 U.S.C. 154(b) by 656 days.

(21) Appl. No.: 12/185,809

(22) Filed: Aug. 4, 2008

(65) Prior Publication Data

US 2009/0089625 A1 Apr. 2, 2009

Related U.S. Application Data

(60) Provisional application No. 60/953,684, filed on Aug. 2, 2007.

(51) Int. Cl.
*H04L 29/06* (2006.01)
(52) U.S. Cl.
USPC .................................................. 726/3; 726/22
(58) Field of Classification Search .................. 726/1, 2, 726/3, 4, 22, 23, 24, 25, 17; 713/168, 170
See application file for complete search history.

(56) References Cited

U.S. PATENT DOCUMENTS

| 7,555,421 | B1 * | 6/2009 | Beckett et al. ................. 703/23 |
| 7,783,463 | B2 * | 8/2010 | Herro .............................. 703/13 |
| 2005/0044197 | A1 | 2/2005 | Lai |
| 2006/0129817 | A1 * | 6/2006 | Borneman et al. ............ 713/170 |

OTHER PUBLICATIONS

PCT/US08/72168, International Search Report and Written Opinion, dated Oct. 22, 2008, 9 pages.
Cantor, Scott, et al, "Assertions and Protocols for the OASIS Security Assertion Markup Language (SAML) V2.0" OASIS, Mar. 15, 2005, 86 pages.
Cutler, Russ, "Liberty Identity Assurance Framework," Liberty Alliance Project, Version 1.1, 2007, 128 pages.
Dierks, T, et al, "The TLS Protocol Version 1.0," IETF RFC 2246, Jan. 1999, 49 pages.
Eastlake, Donald, et al, "XML Encryption Syntax and Processing," W3C, <http://www.w3.org/TR/2002/REC-xmlenc-core-20021210/>, Dec. 10, 2002, 28 pages.
Eastlake, Donald, et al, "XML Signature Syntax and Processing (Second Edition)," W3C, <http://www.w3.org/TR/xmldsig-core/>, Jun. 10, 2008, 35 pages.
Erdos, Marlena, et al, "Shibboleth-Architecture DRAFT v05," <http://people.cs.vt.edu/~kafura/cs6204/Readings/Authentication/ShibbolethArchitectureDraft.pdf>, May 2, 2002, 44 pages.

(Continued)

*Primary Examiner* — Hadi Armouche
*Assistant Examiner* — Izunna Okeke
(74) *Attorney, Agent, or Firm* — Blakely, Sokoloff, Taylor & Zafman LLP; Judith A. Szepesi

(57) ABSTRACT

A method and apparatus to provide identity management deployment interoperability and compliance verification. In one embodiment, the system also provides on-demand services including automated certification, monitoring, alerting, routing, and translation of tokens for federated identity related interactions between multi-domain identity management systems is provided.

20 Claims, 28 Drawing Sheets

OTHER PUBLICATIONS

Hirsch, Frederick, et al, "Security and Privacy Considerations for the OASIS Security Assertion Markup Language (SAML) V2.0," OASIS, Mar. 15, 2005, 33 pages.

"Identity Systems and Liberty Specification Version 1.1 Interoperability," Liberty Alliance Project, Feb. 14, 2003, 16 pages.

"Integration Overview," Ping Identity Corporation, <https://www.pingidentity.com/support-and-downloads/productdocumentation/pingfederate/50/loader.cfm?csModule=security/getfile&pageid=6471>, Jan. 2008, 11 pages.

Kemp, John, et al, "Authentication Context for the OASIS Security Assertion Markup Language (SAML) V2.0," OASIS, Mar. 15, 2005, 70 pages.

"Liberty Alliance & WS-Federation: A Comparative Overview," Liberty Alliance Project, Oct. 14, 2003, 10 pages.

Linn, John, "Liberty Trust Models Guidelines," Liberty Alliance Project, Version 1.0, Jul. 25, 2003, 30 pages.

Meadors, Kyle, "Test Plan for Liberty Alliance SAML Test Event—Test Criteria," Version 3.1, Liberty Alliance Project, Oct. 10, 2008, 47 pages.

Mishra, Prateek, et al, "Conformance Requirements for the OASIS Security Assertion Markup Language (SAML) V2.0," Mar. 15, 2005, 19 pages.

"SOAtest," Parasoft Corporation, <http://www.slideshare.net/Zubin67/soanewds05cdr>, 2007, 2 pages.

Thompson, Peter, et al, "Liberty ID-FF Implementation Guidelines," Liberty Alliance Project, Version 1.2, Dated Apr. 14, 2003, 34 pages.

PCT/US2008/072168, International Preliminary Report on Patentability, Date of Issuance Feb. 2, 2010, 4 pages.

"End to End Testing & Validation," <http://www.parasoft.com/jsp/products/article.jsp?articleId=3114>, Accessed Oct. 9, 2012, 2 pages.

"Service Virtualization: The Next Frontier for Testing," <http://alm.parasoft.com/service-virtualization-testing/>, 2012, 8 pages.

"SOAtest with Parasoft Load Test," <http://www.parasoft.com/jsp/products/soatest.jsp>, Current Version 9.2.7, Dated Aug. 8, 2012, 1 page.

"Virtualize," <http://www.parasoft.com/jsp/products/virtualize_splash.jsp?itemId=538>, Accessed Oct. 9, 2012, 1 page.

* cited by examiner

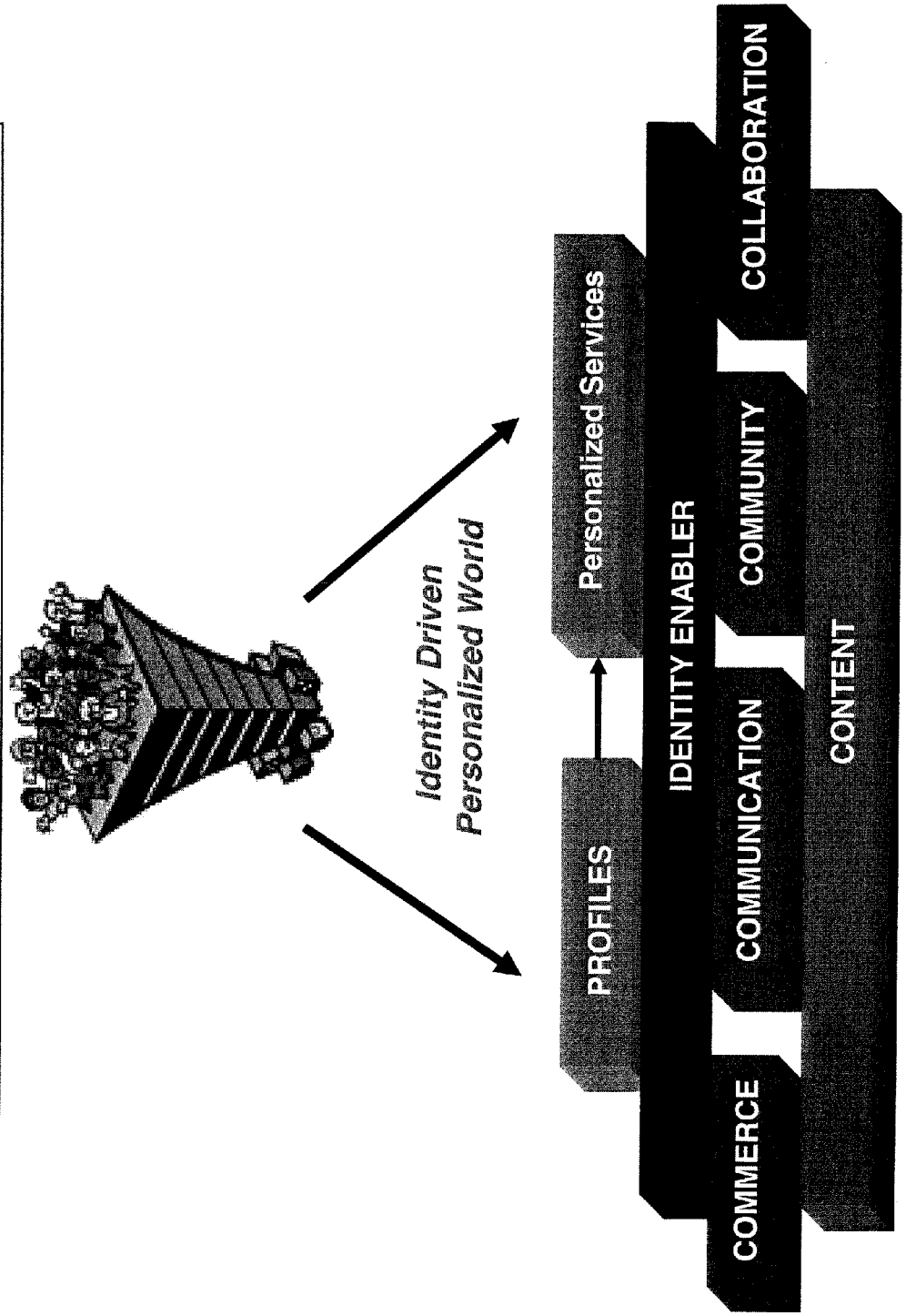

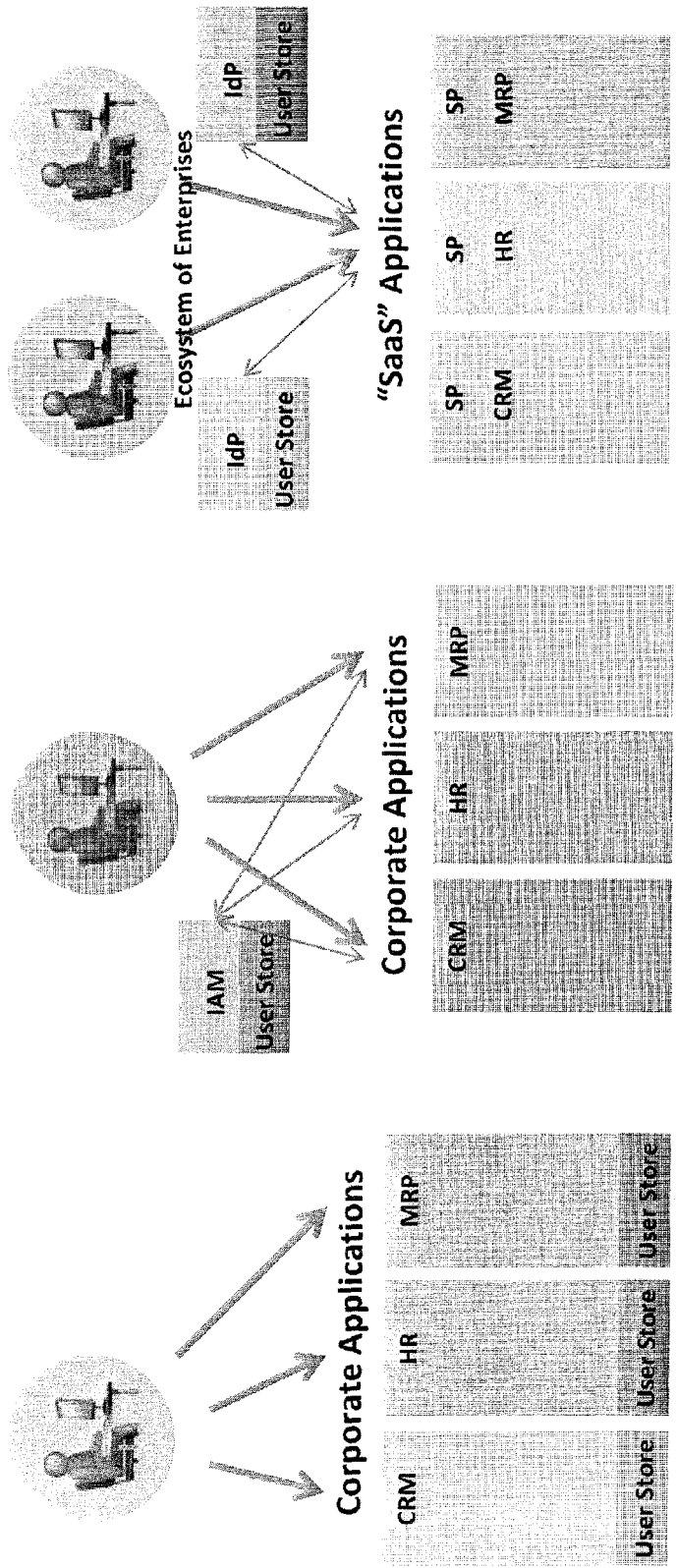

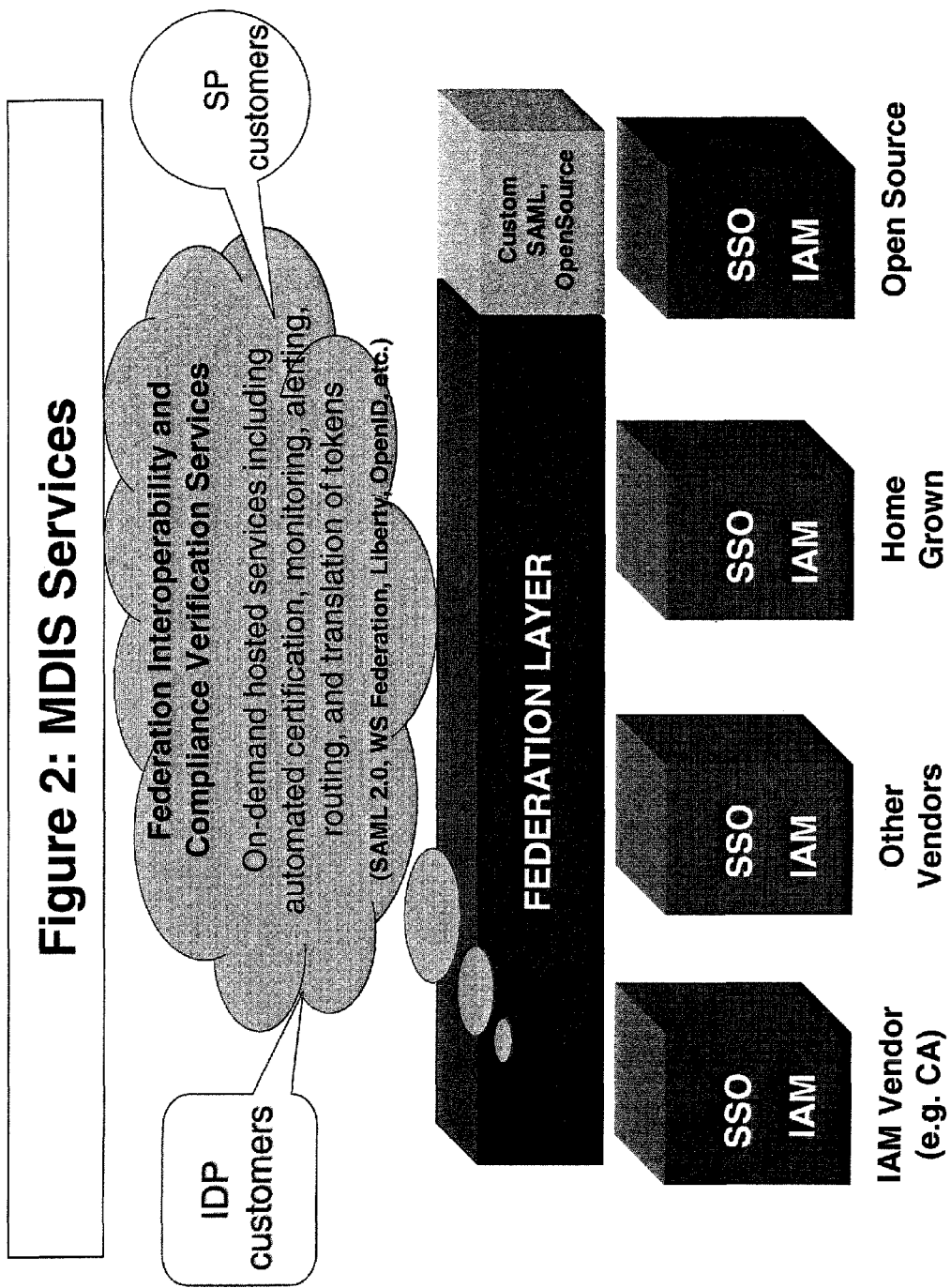

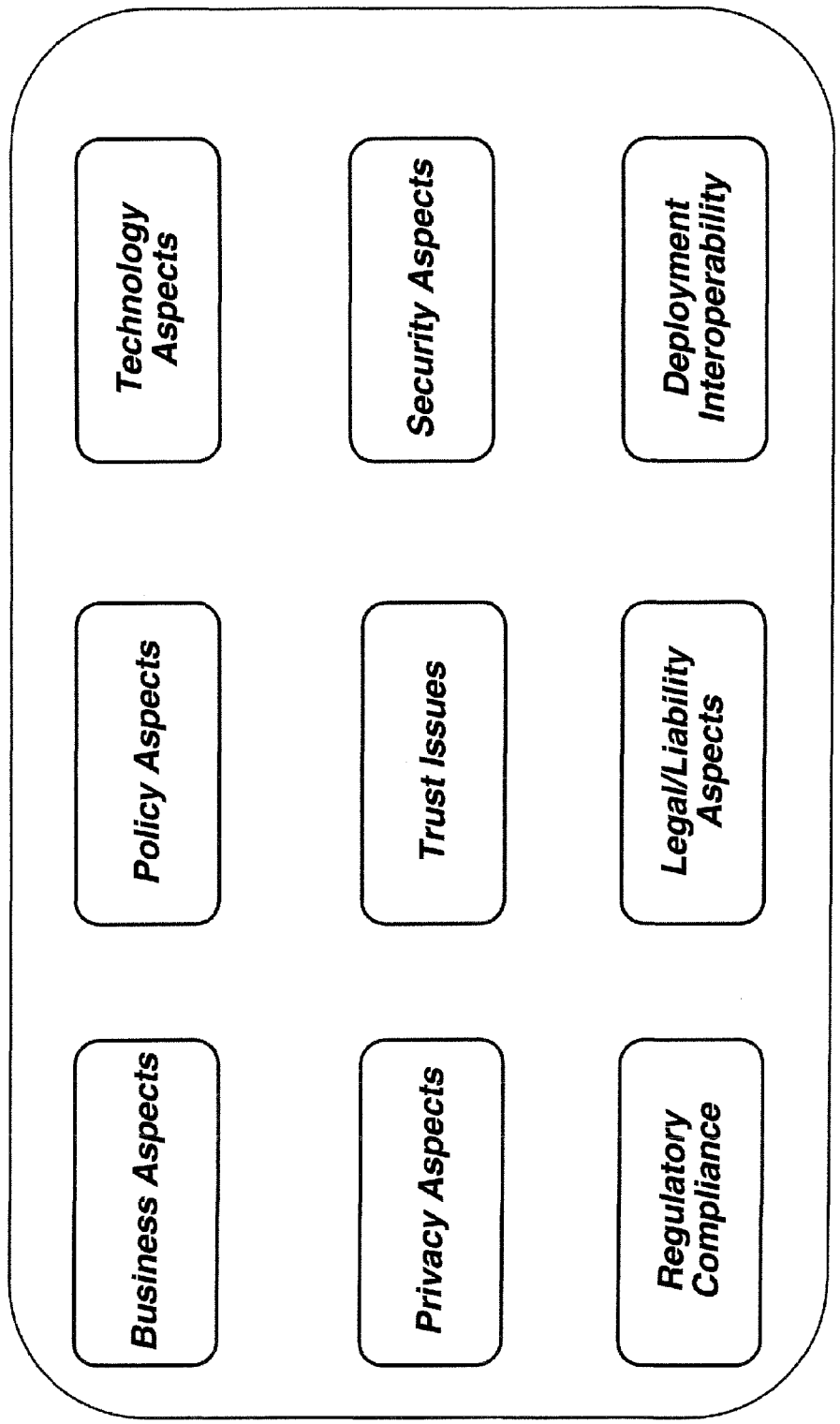

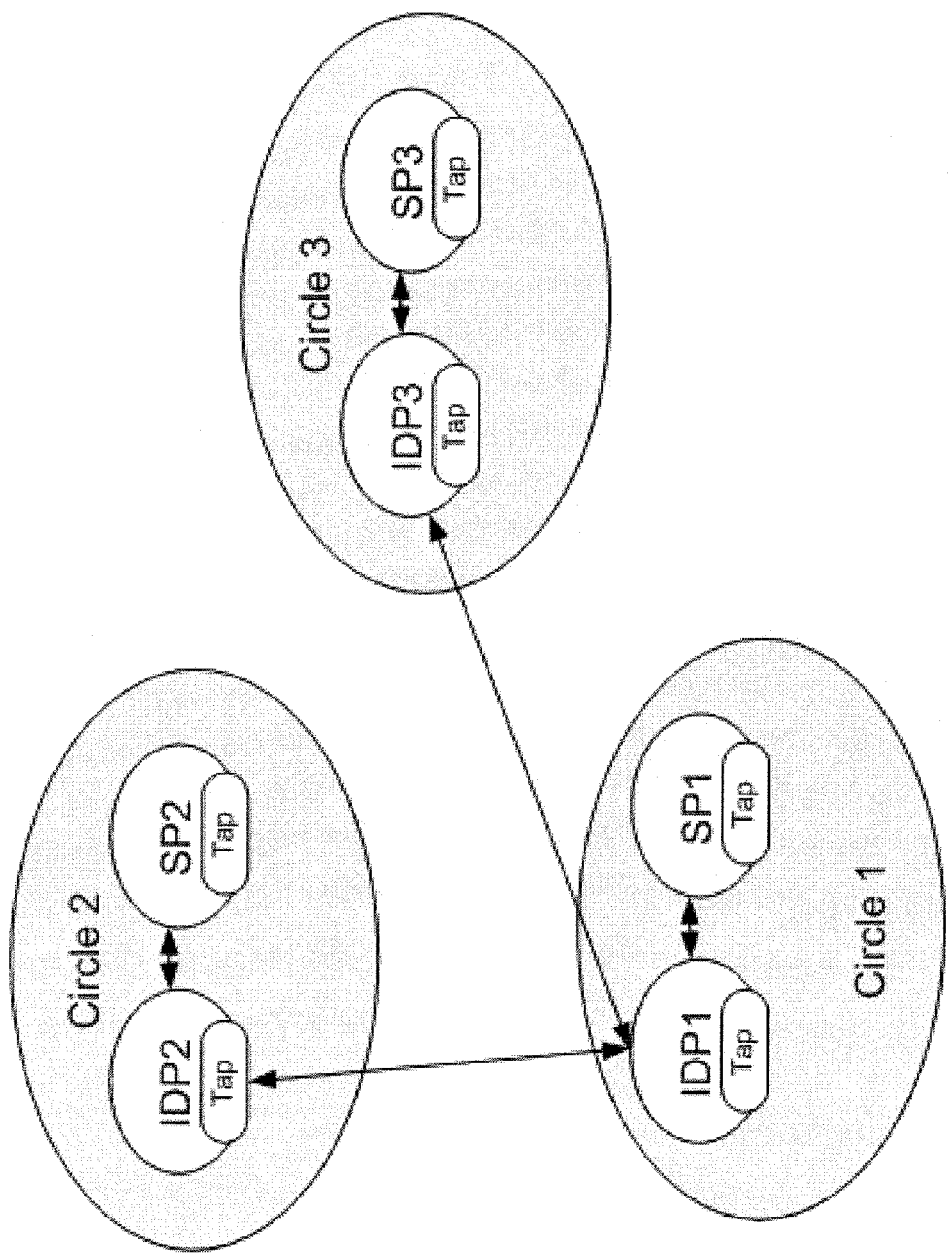
Figure 5I: Primary IdM Deployment Models

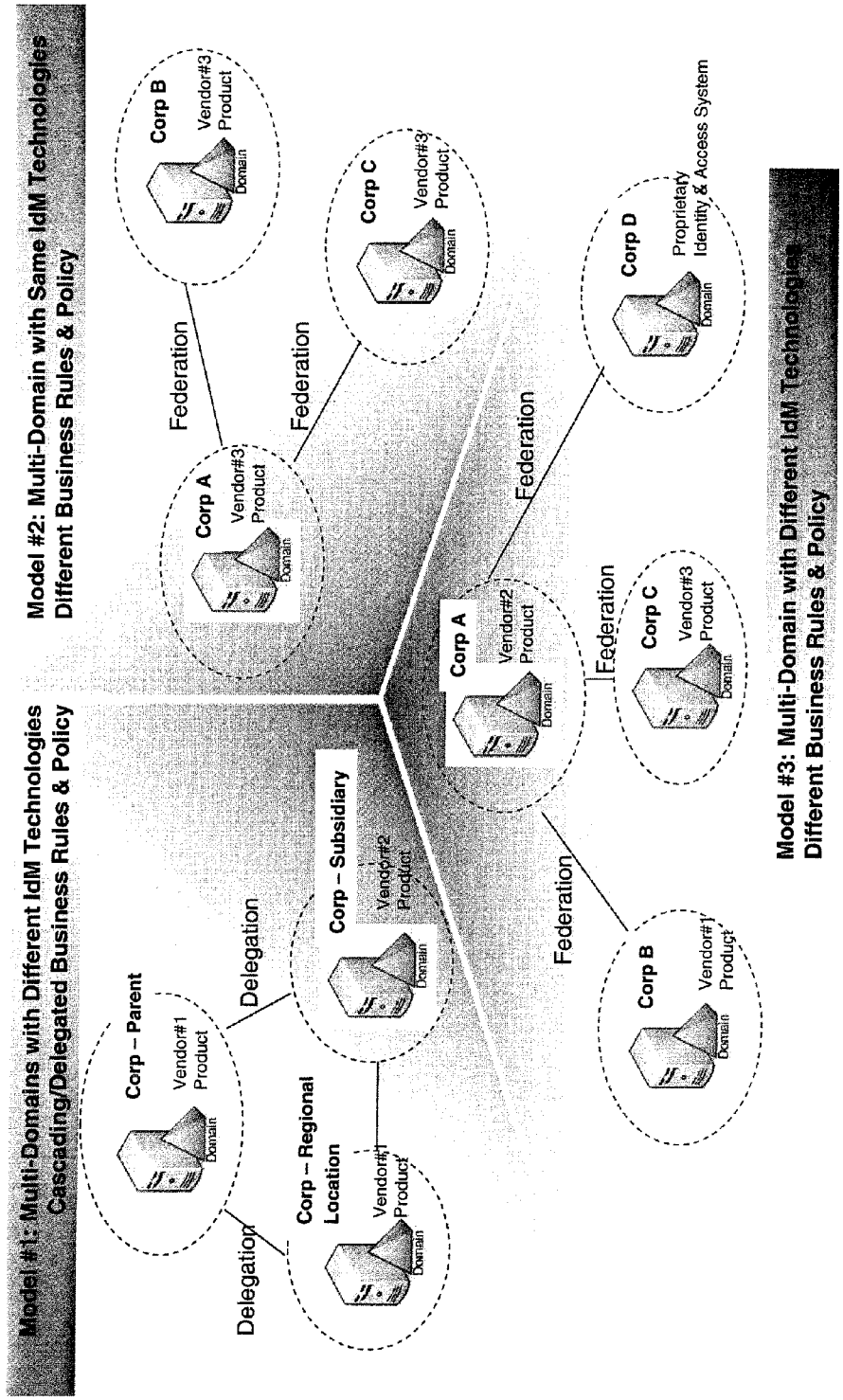
Figure 5J: Corporate IdM Deployment Models

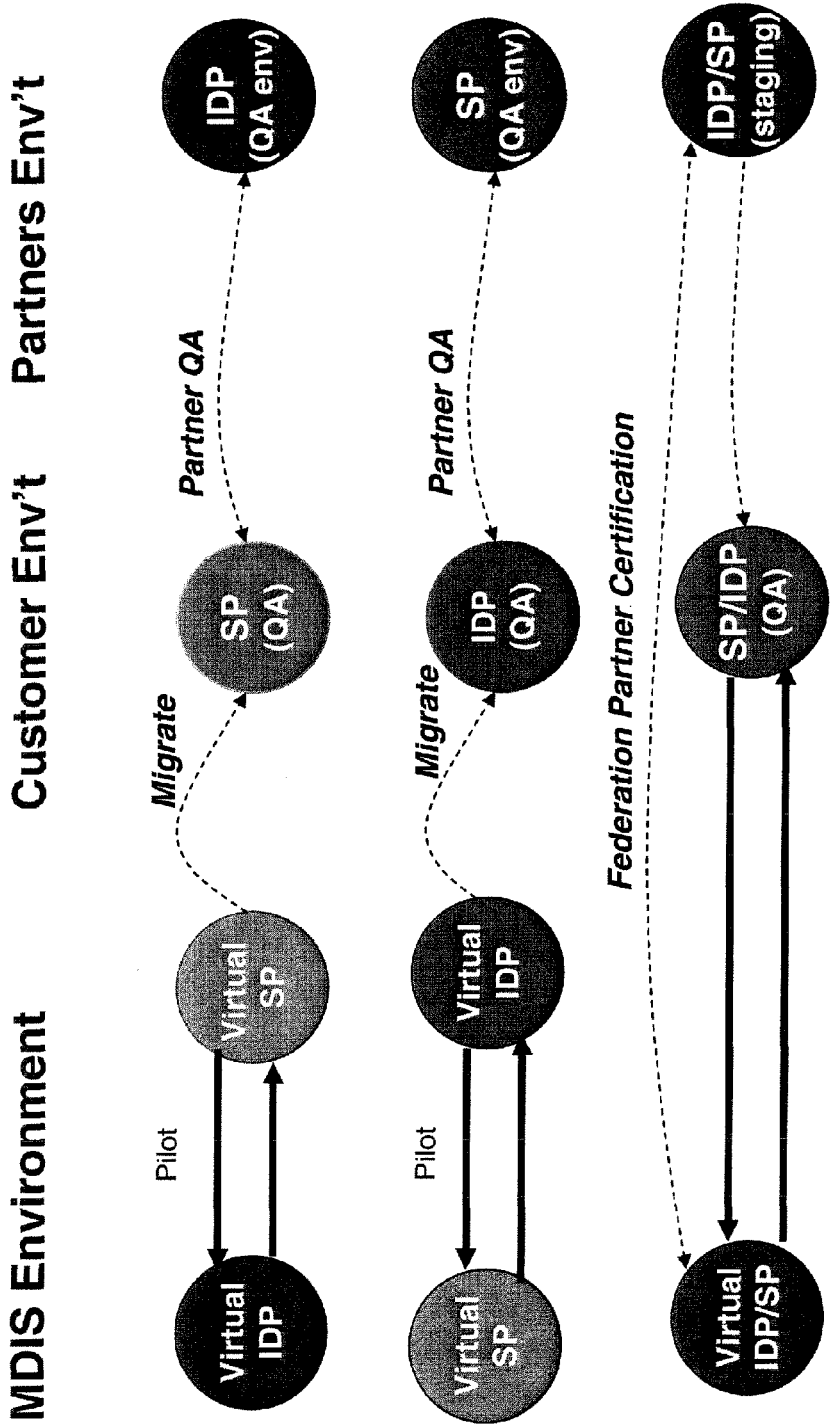

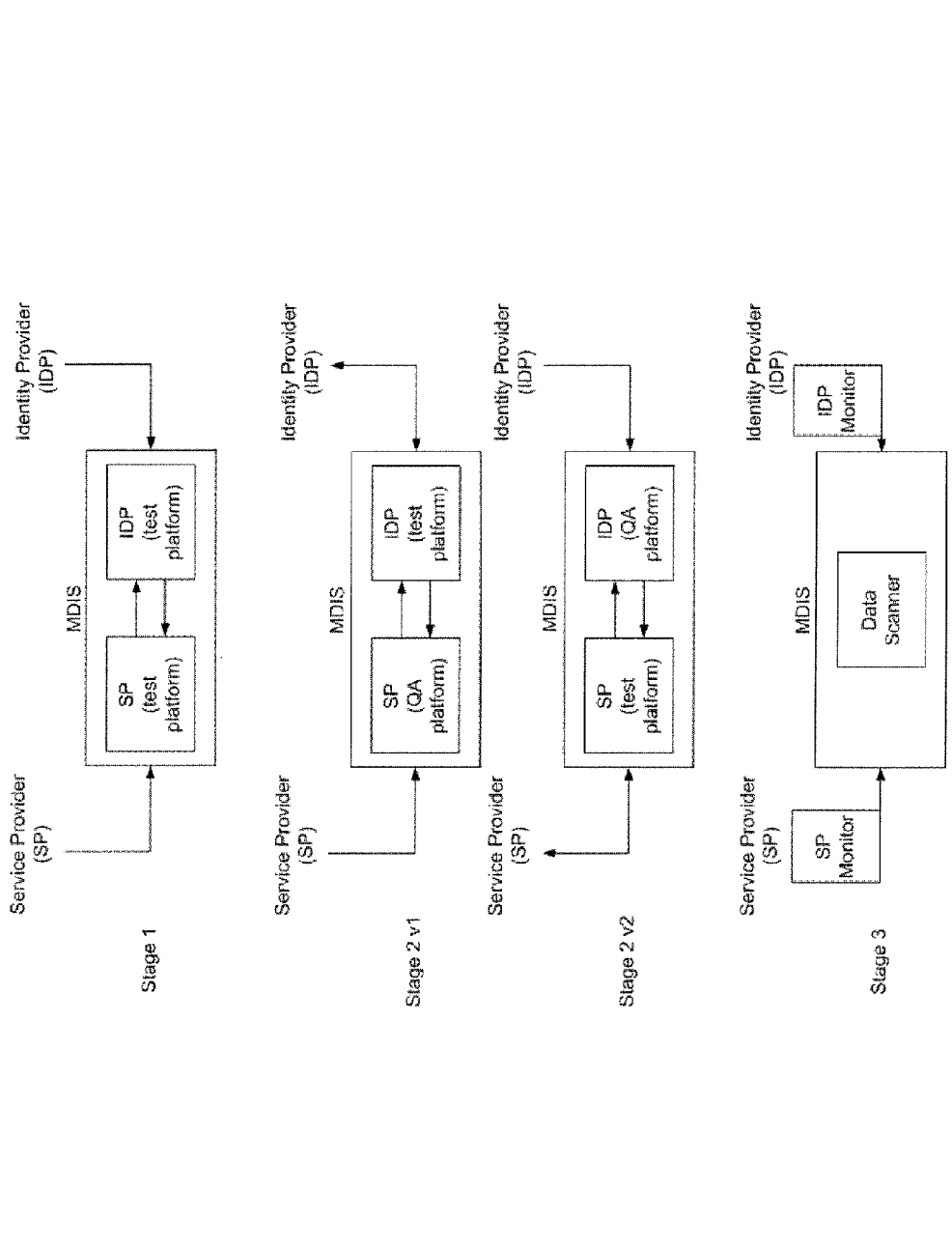

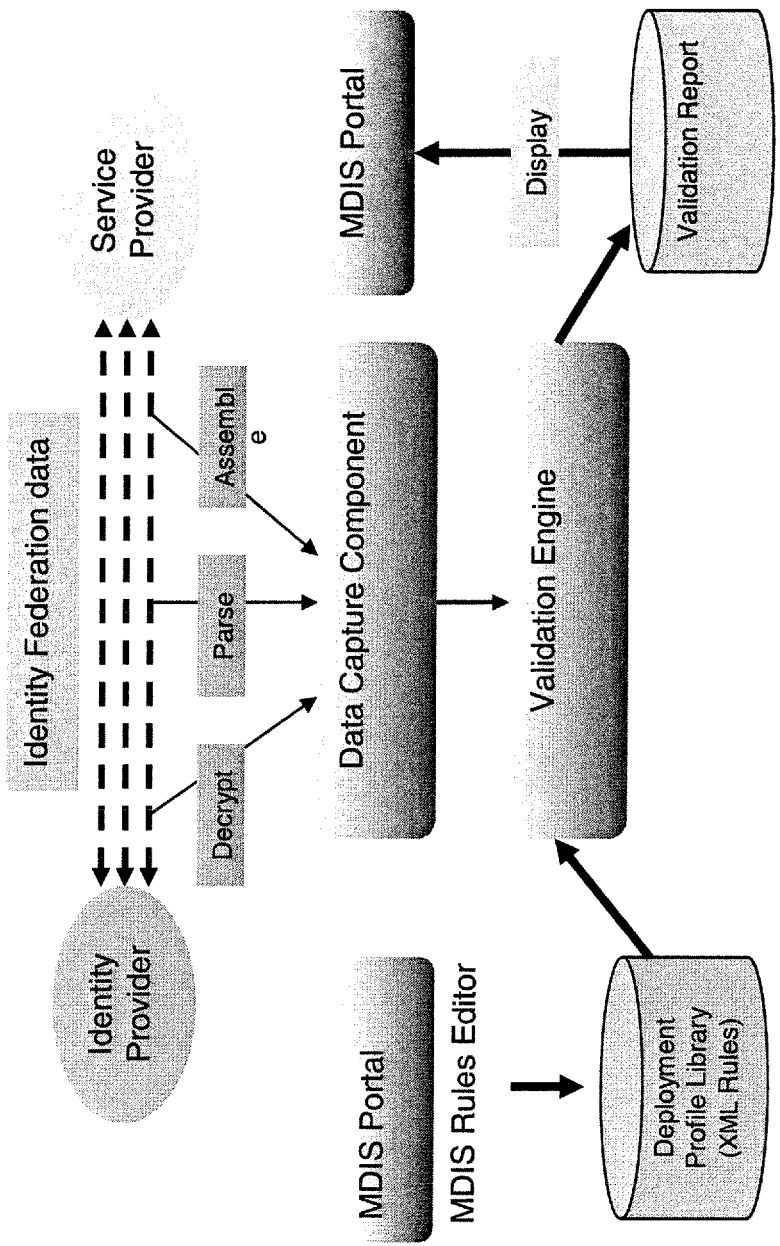
Figure 7A: Overview of MDIS System

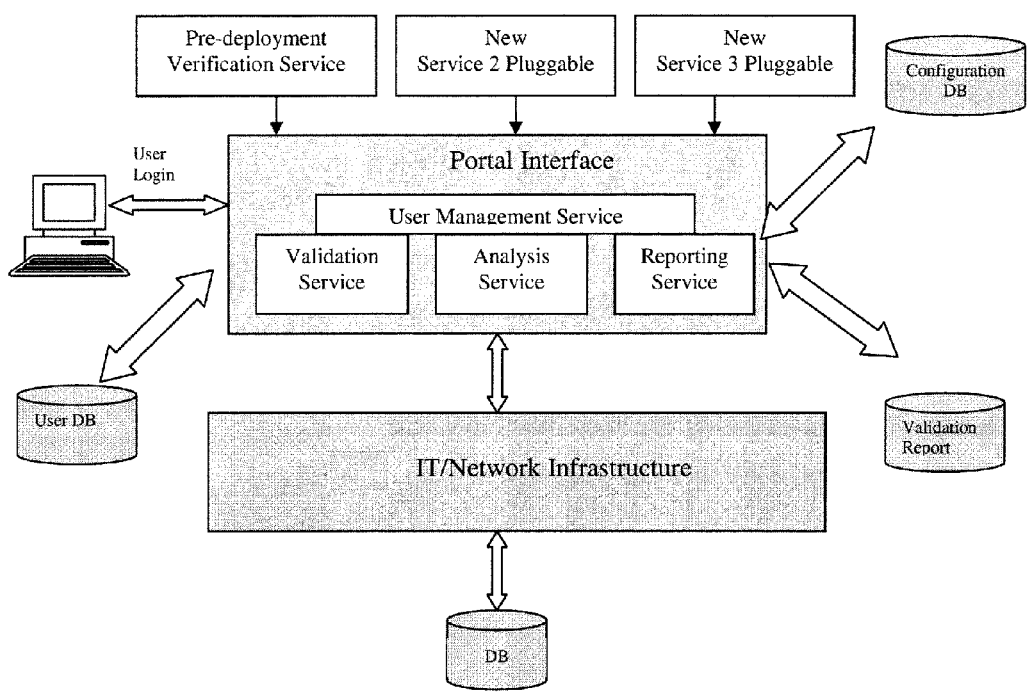

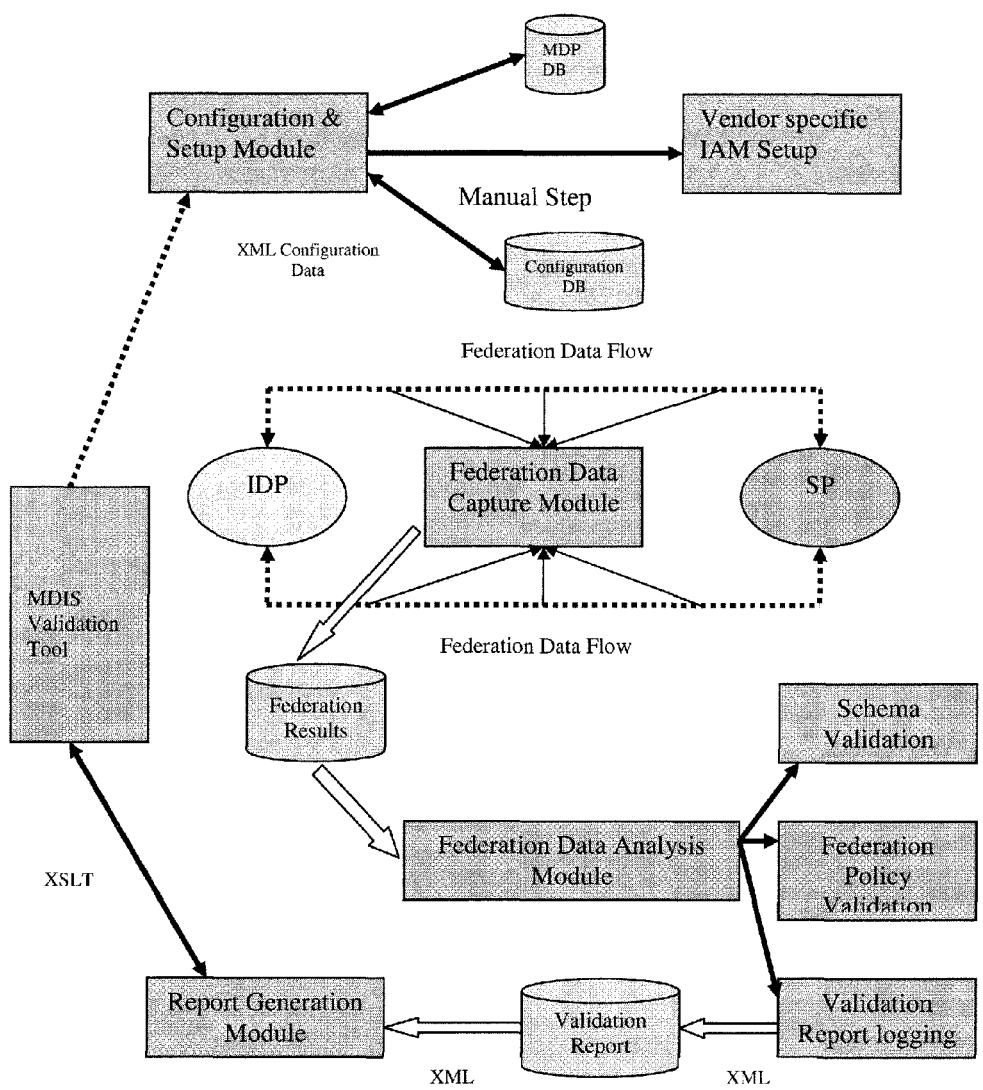

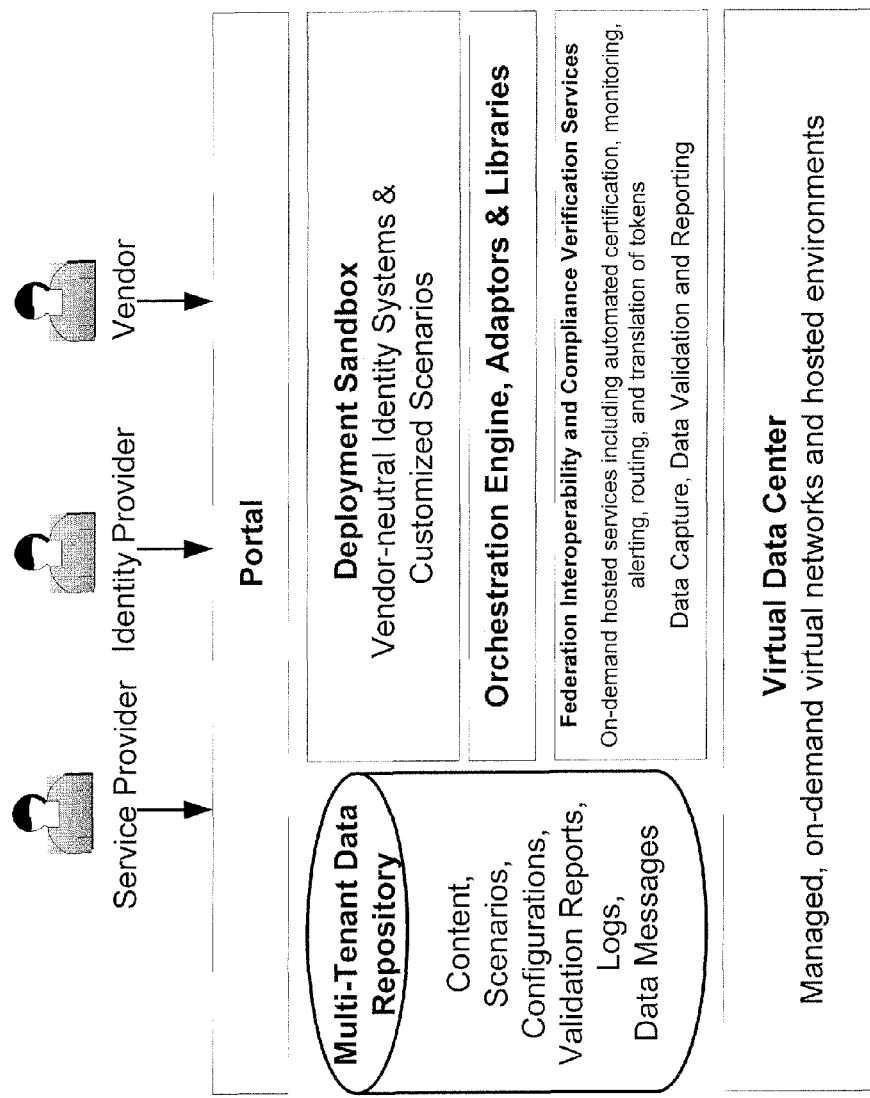
Figure 8A: MDIS Architecture

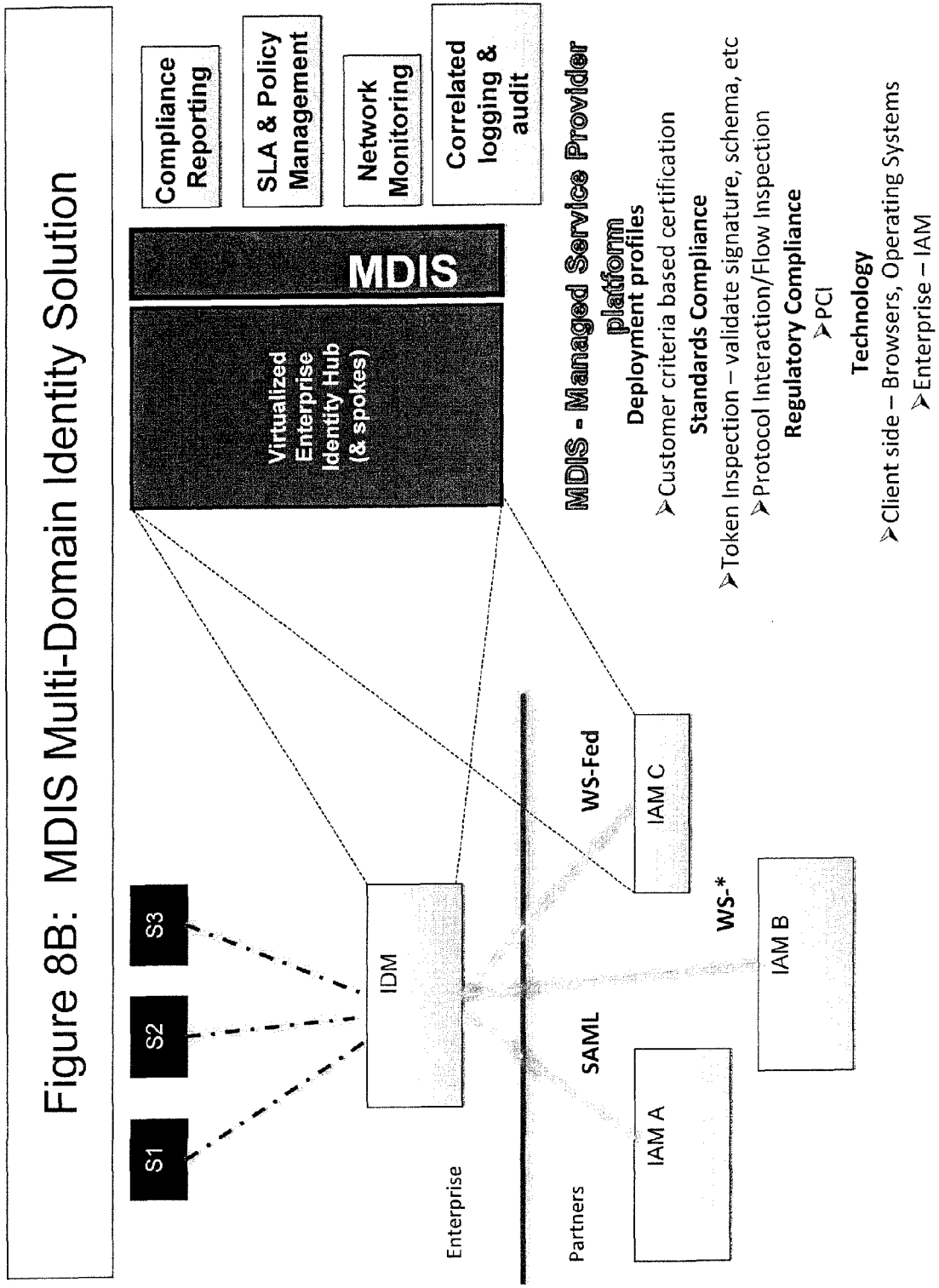

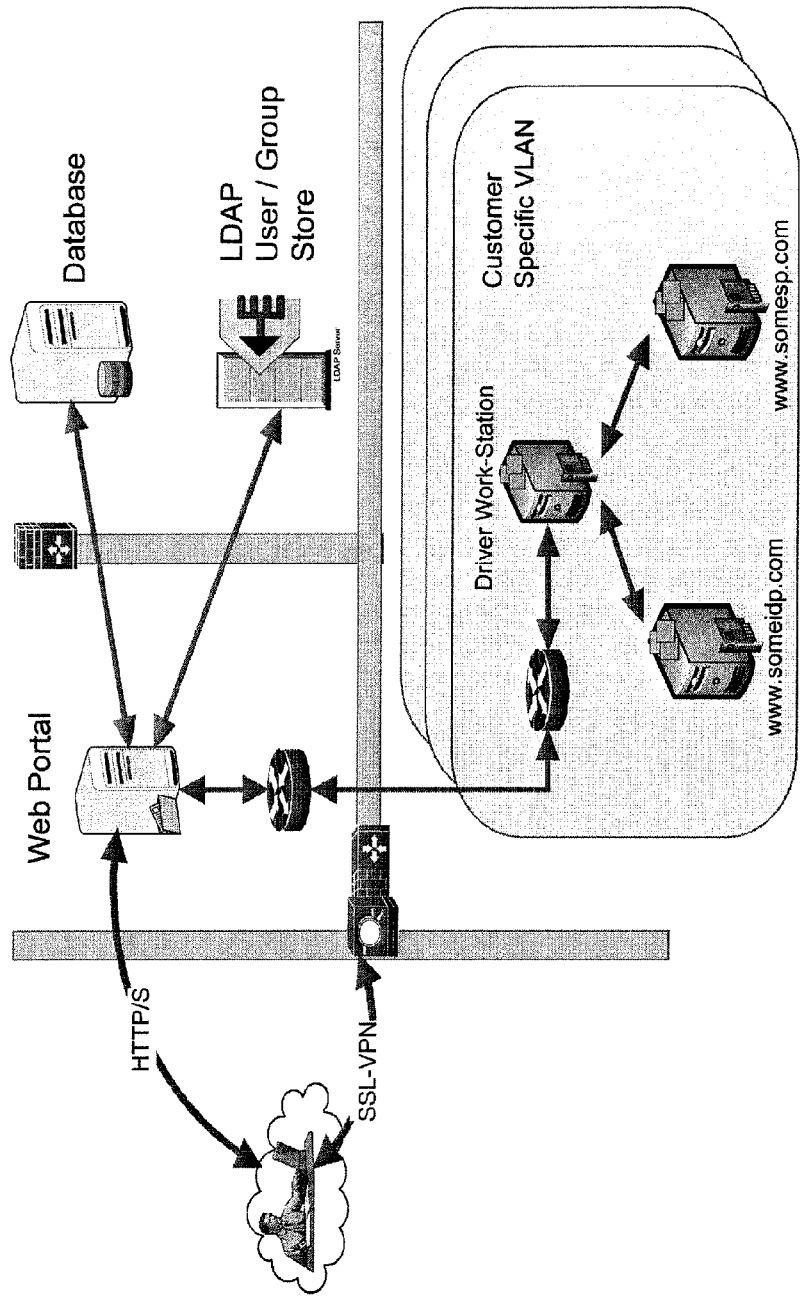
Figure 9A: Virtual Machines and VLAN Architecture

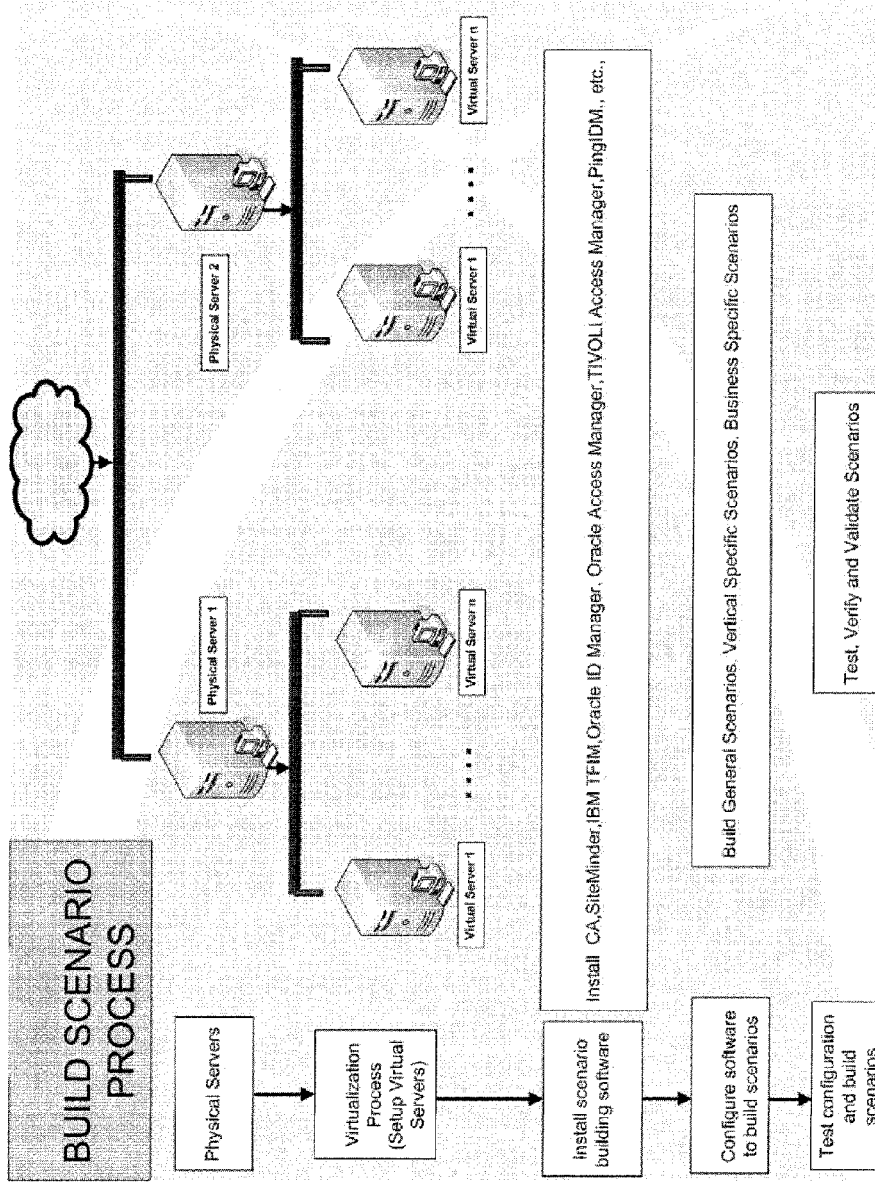
Figure 10: MDIS Virtual Identity Hub Build Scenario Process

Fig. 14: Federation & Web Services Life-Cycle Management

Figure 15: Automated Federation Monitoring

Figure 16: Typical Federation & MDIS Services

Figure 17: Summary of MDIS Services

Fig. 18: Exemplary User Interface for MDIS Portal

METHOD AND APPARATUS FOR MULTI-DOMAIN IDENTITY INTEROPERABILITY AND COMPLIANCE VERIFICATION

RELATED APPLICATION

The present application claims priority to U.S. Provisional Application Ser. No. 60/953,684 filed on Aug. 2, 2007, which is incorporated herein in its entirety.

FIELD OF THE INVENTION

The present invention relates to identity, and more particularly to federated identity management.

BACKGROUND

Digital Identity is the corner stone for internet security and is becoming pervasively important with the emergence of internet businesses and online services offered over the internet. As a direct consequence of this, many industry verticals like financial services, government, insurance, healthcare, pharmaceutical, retail, telecommunication companies and Web 2.0 small businesses are adopting digital identity (hence forth referred to as identity) technologies in their portfolio of offerings.

Identity federation (hence forth referred to as federation) is an important aspect of identity management solution which enables businesses to seamlessly exchange user information such as user name, credentials, attributes, and policy in a secure manner without compromising the identity and privacy of the user. One of the biggest problems that identity federation solves is the ability to provide web users with a true single sign on (SSO) experience across service providers who are within disparate domains or infrastructures. While SSO adds great value to the business in terms of improvements to, or perhaps complete elimination of, the need for user and password administration and in giving rich user experience to clients of the business, it does introduce many challenges in the areas of user privacy and trust between business partners among others including software as service (Saas) providers and business process outsourcers (BPOs).

In the recent years, vendors and customers of identity management products have been working closely to produce standards to address many of the challenges of identity federation in a uniform and non proprietary manner. This effort has led to the emergence of multiple specifications such as SAML1.1, SAML2.0, Liberty Alliance ID-WSF, Web Services Standards (WS-*), OpenID, etc.

SUMMARY OF THE INVENTION

A method and apparatus to provide identity management deployment interoperability and compliance verification. In one embodiment, the system also provides on-demand services including automated certification, monitoring, alerting, routing, and translation of tokens for federated identity related interactions between multi-domain identity management systems is provided.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is an illustration of one embodiment of the overall vision of this system.

FIG. 1B shows one embodiment of the identity management formats for an enterprise.

FIG. 2 is a block diagram of one embodiment of the MDIS services.

FIG. 4 is an illustration of one embodiment of the various aspects of federation.

FIGS. 5A-J are illustrations of various embodiments of relationships between IDPs and SPs.

FIG. 6A is a diagram showing one embodiment of staged deployment and certification configurations.

FIG. 6B is a diagram showing one embodiment of the stages of deployment.

FIG. 7A is a diagram showing one embodiment of an overview of the MDIS System.

FIG. 7B is an architecture diagram of one embodiment of the MDIS system elements.

FIG. 7C is an overview block diagram of one embodiment of the MDIS certification framework.

FIG. 8A is a block diagram of one embodiment of the MDIS architecture.

FIG. 8B is a diagram showing one embodiment of a MDIS solution which simulates the customer's IDM environment as well as their partner IDM.

FIG. 9A is a block diagram of one embodiment of the configured virtual machine and VLAN architecture.

FIG. 10 is an illustration of one embodiment of an MDIS virtual identity build scenario process.

DETAILED DESCRIPTION

Figure 3:
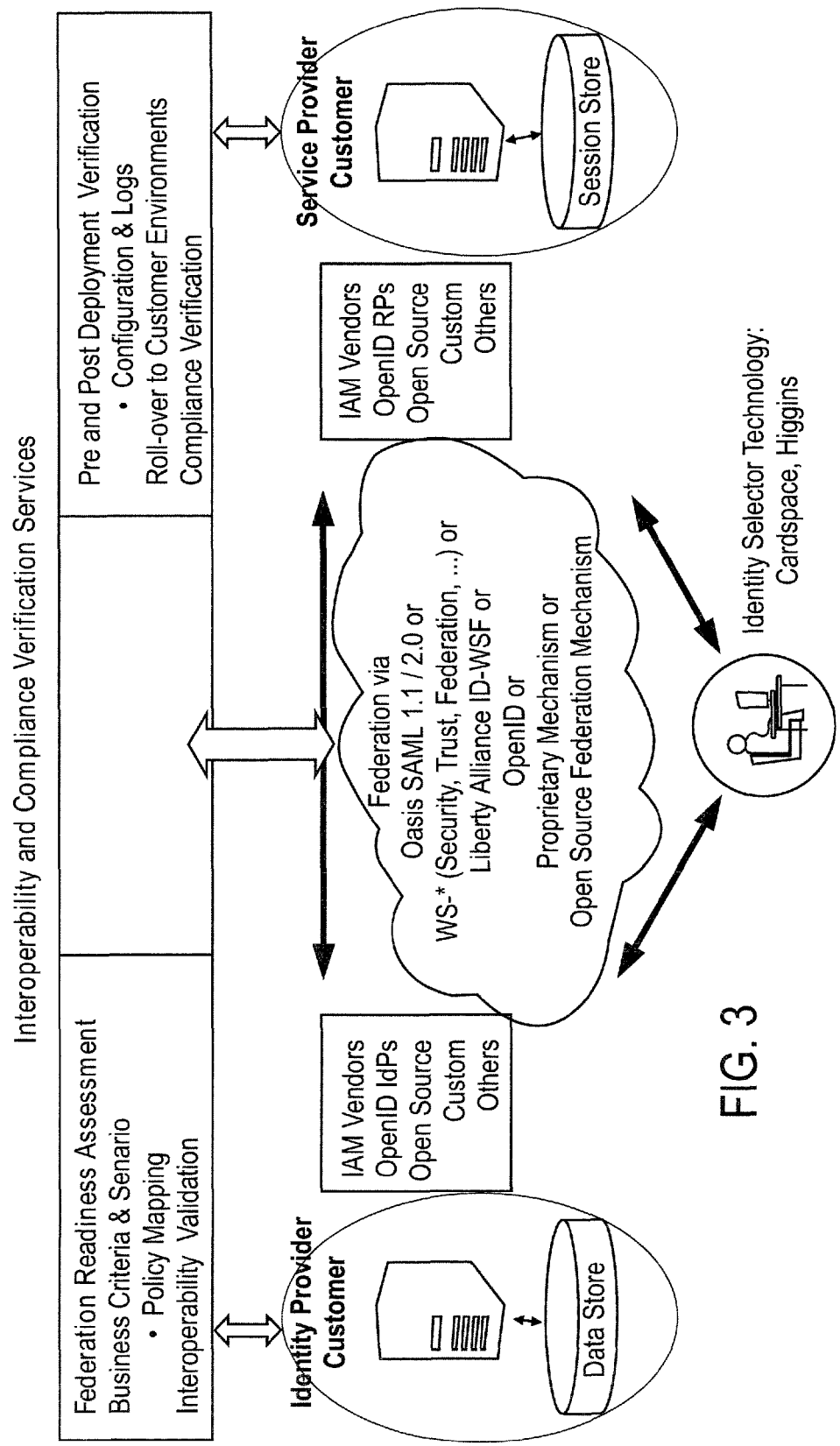
FIG. 3 is an illustration of one embodiment of the entities and protocols involved in a Federation.

The method and apparatus described is an identity federation technology that enables the rapid interfacing between identity management systems operating in accordance with different standards. Although all the leading vendors of Identity and Access Management (IAM) products have started to offer standards based implementations, these specifications fall short when it comes to actual deployments which include business, policy, compliance and technology requirements.

One important aspect of adopting an identity federation technology is the ability of that technology to not just solve the SSO problem but how well it can deal with the business criteria of the enterprise and all of its partners in that industry segment. The business criteria as it applies to federation, comprises in one embodiment: business policies, contracts, legal issues, liabilities, security and privacy policies, technology interoperability, and similar issues encountered by a business. Before investing in a particular federation product, it is absolutely critical for a customer to assess, evaluate, test and certify the product capabilities as it applies to the comprehensive business criteria of the enterprise. This also involves evaluating and testing for interoperability between vendors offering products based on multiple standards (SAML, WS-*, ID-WSF etc.).

The challenges that enterprises face in adopting federation technology is the interoperability issues arising from a disparate set of business criteria between federating partners. The present system solves this problem, in one embodiment, by providing one or more of the following features:

Deployment based pre-production interoperability;
Compliance verification services;
Virtual Federated Identity Hub-Spoke hosting including various scenarios;
Partner Federation enablement—Deployment services;
Partner Federation Certification, including Interoperability Testing and Compliance Verification;
Monitoring, Alerting and on-going Federation Mgmt services (live mode);
Hosted Federation routing, translation services.

These features help enterprises to evaluate and choose a technology that satisfies critical business criteria and maximizes return on investment (ROI).

The present invention is a MDIS (Multi-Domain Identity Services) platform that offers, in one embodiment, a deployment/business criterion based hosted certification and testing services on a "pre-production" or "pilot" basis. The system provides a quality assurance/verification in a controlled environment, with controlled and targeted roll-over into a production environment. In one embodiment, the system may further provide an ability to pre-qualify partners to ensure that they can be integrated into the QA/verification environment as well as support for post-deployment verification of partner federations. The MDIS platform may further provide additional features. The location where this deployment takes place can be referred to as a virtual identity hub. The virtual identity hub includes one or more virtual IDPs and/or SPs. It is used to simulate a real-world environment, but is enclosed and fully monitored. The identity governance addresses the needs of enterprises producing and consuming identity data to adhere to applicable policies, both business and legal, such that all parties involved in a federated identity transactions can manage risk and provide privacy protection to users. MDIS helps reduce security risks by providing a pre-production testing and certification environment to such enterprises.

FIG. 1A illustrates one embodiment of the overall vision. It includes a content layer, on top of which there are one or more of commerce, communication, community, and collaboration technologies/services. At least some of these aspects may need a user to be properly identified, i.e. signed on or identity validated. An identity enabler is used to do this. In one embodiment, user profiles interact with personalized services, such as EPIC 1.0 services to provide identity, authentication, identity profile (e.g. age), and validation information to the applications and/or the user.

FIG. 1B shows one embodiment of the identity management formats for an enterprise. It shows "Stove Pipe" applications with maintenance, time to market and & service level issues. After stove-pipe applications, the corporation can move to "internal" federation for improved internal maintenance, time to market, and service levels. However, this still restricts the user within the domain. Finally, the corporation can move to an ecosystem of enterprises which includes internal and external federation, for cross-domain sharing of services. This provides improved operations and cost effectiveness.

FIG. 2 illustrates one embodiment of MDIS Services which may be provided. MDIS provide a means to assure the interoperability and compliance of Identity Provider (IDP) and/or Service Provider (SP) customers that are interfacing with various identity management vendor products. Such products may include custom/home grown and/or open source implementations. The federation, in one embodiment, is provided in accordance with the Liberty Alliance. OASIS SAML, WS-Federation, or another appropriate specification. In some instances, there may also be custom SAML, and open source federation. However, these federation standards do not ensure that the communication will meet the business goals and policies of the customers.

The federation interoperability and compliance verification services, provided using the MDIS platform, are designed in one embodiment to ensure that the federated identity services meet the business goals and criteria of the customers. In one embodiment, the services provided may include on-demand hosted services including automated certification, monitoring, alerting, routing, and translation of tokens. In one embodiment, MDIS has customer vertical specific SAML or Web Services security deployment profiles for which federation certification is automated.

A deeper look at one embodiment of the federation components is provided in FIG. 3. This figure provides an exemplary list of some of the popular vendors, protocols, and components of the MDIS service.

In one embodiment, successful federation has various aspects, as shown in FIG. 4. These aspects range from trust issues, to regulatory compliance, and business aspects. In order to provide services to a customer, simply providing federation which enables communications between the various IAM vendor products is not optimal. The MDIS platform in one embodiment provides a system in which all these aspects of federation are considered and verified for the customer. Using the MDIS process, the system provides governance and risk mitigation. Furthermore, security risk is minimized up-front, by ensuring that communications and partners are certified.

FIG. 5A-J show some of the configurations that an Identity Provider (IDP) and a Service Provider (SP) could have. The IDP and SP interact. In one embodiment, during pre-production certification, the IDP and/or SP may be implemented within the secure sandbox of the MDIS environment. Then, once the system is rolled out into production, in one embodiment the MDIS platform may maintain taps on the IDP and SP deployments. These taps, in one embodiment provide the identity data exchanges between the IDP and the SP to the MDIS platform, enabling the MDIS platform to provide real-time verification and compliance monitoring.

Figure 18:
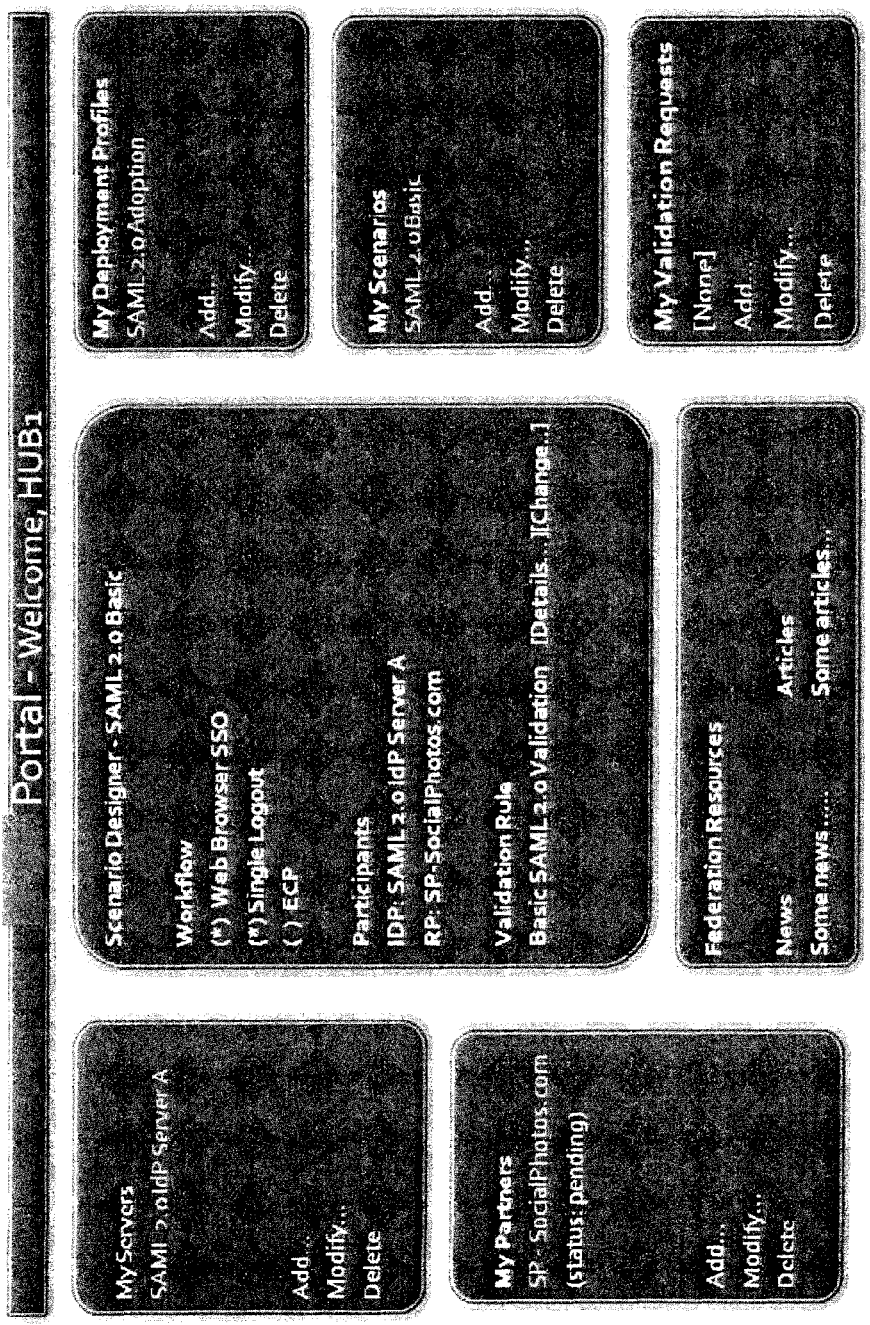
FIG. 18 is an exemplary user interface for an MDIS portal.

In one embodiment, the MDIS system includes an IDP hub, an SP, and a browser. The browser is part of the MDIS environment and enables a customer to log into the system. In one embodiment, the customer connects through a remote desktop, and logs securely into the portal. FIG. 18 is an exemplary user interface for an MDIS portal. As can be seen, the portal hub enables management of deployment profiles, as well as partners, partner certificates, validation requests, etc.

In one embodiment, during a certain phase of deployment, the browser, SP, and/or IDP can be external to MDIS (e.g. use the deployed browser/SP/IDP).

In one embodiment these taps are web services interface to the IDP and SP deployments that enable real-time access to their respective logs to enable the MDIS platform to provide real-time health monitoring and correlated audit log access. In one embodiment, each of the IDPs and SPs in the federation has a tap, to provide complete data to the MDIS platform. In another embodiment, the MDIS platform is capable of providing services even when taps are not available for all SPs and IDPs.

Figure 5A:
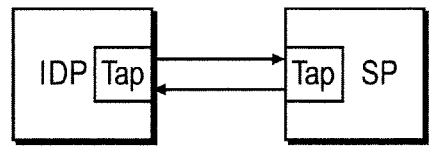

As shown in FIG. 5A, a single IDP and SP may provide services to each other. In one embodiment, the multi-domain services provided by the present system are provided through taps at both the IDP and SP. The taps, in one embodiment, send copies of transmissions between the IDP and the SP to a separate secure storage server, which then provides the MDIS platform.

Figure 5B:
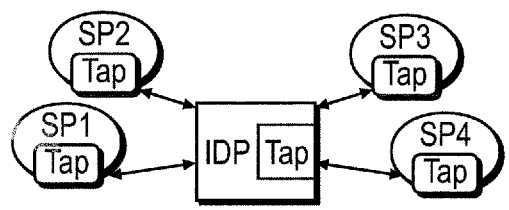
Figure 5C:
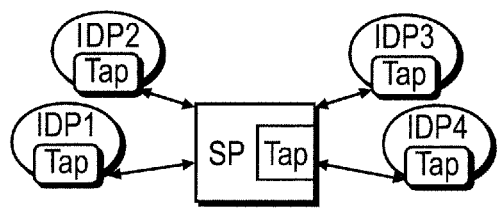

As shown in FIG. 5B, an alternative organization of the system may be a single IDP which provides services to multiple SPs. This organization is referred to as the hub and spoke model. In one embodiment, the IDP has a tap and one or more of the SPs also have a tap. In an alternative model, in which there is a single SP receiving identity services from a number of different IDPs is referred to as the community model. This alternative hub and spoke model is one in which a single SP receives services from multiple IDPs, as shown in FIG. 5C.

Figure 5D:
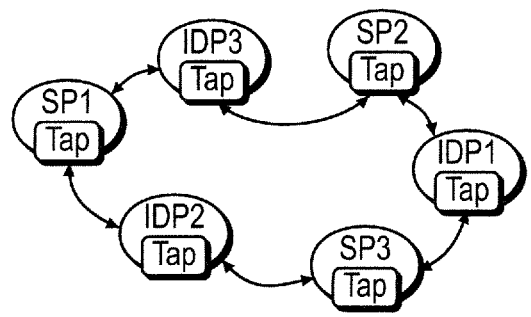

FIG. 5D is an alternative organization of the system, involving a consortium model. In this system, various IDPs interact with various SPs, and vice versa. As noted previously, one or more of the SPs and IDPs may have taps. In one embodiment, each SP is coupled to two IDPs, and each IDP provides services to two SPs. In one embodiment, no SP is coupled to another SP, since SPs cannot provide services to each other.

Figure 5E:
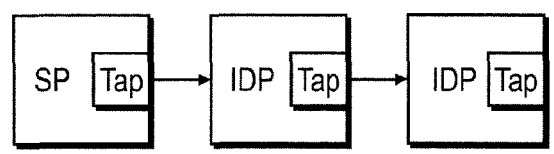

FIG. 5E is an alternative model, referred to as the delegated or proxy model. The SP sends its request to the first IDP, which in some instances cannot fulfill the request. In that case, the first IDP may pass the request on to second IDP which can provide the identity services requested by the IDP.

Figure 5F:
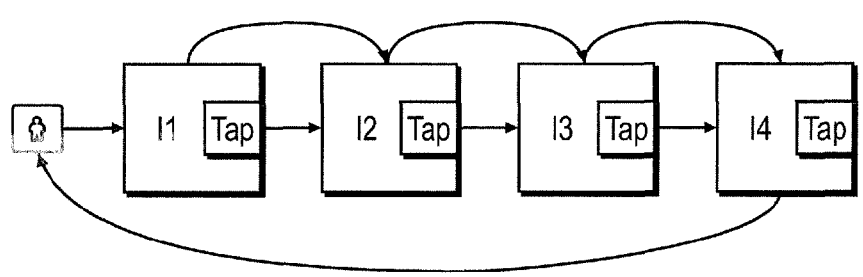

FIG. 5F is an alternative model, referred to as the intermediary model, in which there is a requesting user, who contacts an SP or IDP I1, who may pass the request on to one or more other SPs and/or IDPs. The final SP/IDP in the chain provides the services back to the requesting user. As noted above, the taps in each of the SPs and/or IDPs (I1 through I4) provide data on the flow of the request and response, which is used by the MDIS platform.

Figure 5G:
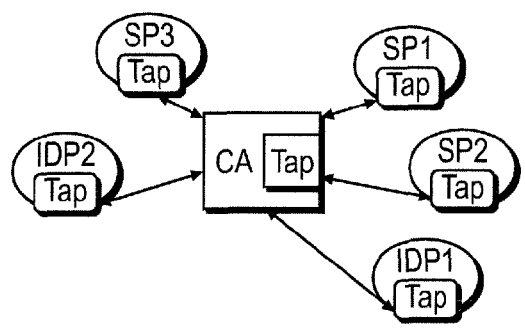

FIG. 5G is an alternative model, referred to as the peer to peer governed model. In that model, the central authority receives requests from one or more SPs, and passes the requests to an IDP which can fulfill the request.

Figure 5H:
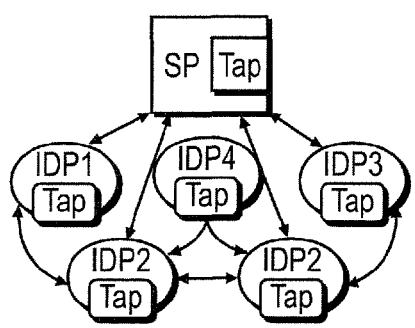

FIG. 5H is an alternative model, referred to as the peer-connected model, in which there is an SP, and numerous IDPs coupled to the SP and to each other. Unlike the hub and spoke model, in this model the IDPs also communicate with each other, and may provide services for each other.

FIG. 5I is an alternative model referred to as the circles of trust model. In that model, there are numerous circles of trust. Each circle of trust can embody one or more of the models described above with respect to FIGS. 5A-H. However, the IDP(s) in each circle of trust can, in one embodiment, communicate with other IDPs in other circles of trust.

FIG. 5J illustrates three exemplary deployment models, including exemplary deployments with delegation, and federation between entities having different business rules, policy and technology. The MDIS system described in one embodiment is capable of handling each of these scenarios.

In each of the above configurations, in one embodiment, in a pre-production model, the MDIS platform is interposed between each IDP and SP. This is shown in exemplary embodiments illustrated in FIGS. 6A and 6B. Once the deployment is complete, and the system is in use, in one embodiment taps may be used to obtain data about how the deployment is performing and interoperating. In one embodiment, taps may be part of each of the IDP and SP implementations. In another embodiment, only a subset of the IDPs and/or SPs may have taps. The taps, in one embodiment, enable live managed services and real-time monitoring, alerting and verification.

FIG. 6A illustrates staged deployment and certification configuration. The process includes an MDIS environment, a customer environment, and partner environments. The process initially starts out with a virtual IDP and virtual SP. The virtual SP is then migrated to the customer environment, in one example. In another example, the virtual IDP is migrated to the customer environment. The migrated IDP/SP relates to a QA stage SP/IDP. In one embodiment, the QA stage SP/IDP is in a partner environment. Finally, the customer IDP moves to a staging environment. At that point, the federation partner is certified, in one embodiment.

FIG. 6B is a diagram showing one embodiment of the stages of deployment. The system is initially deployed entirely within the MDIS sandbox, with both the SP and the IDP being contained within the test/certification platform. Once the initial proofing is finished, either the SP or the IDP is moved from the sandbox to a pre-production state. This state can provide "live" testing/certification of the system, but the MDIS sandbox still hosts the corresponding service (IdP or SP). This is a QA stage, where full interaction can be simulated.

At stage 3, both the IDP and the SP are removed from the sandbox, and moved to actual production state. However, a tap, or monitor, is inserted into both the IDP and the SP deployment. The tap or monitor sends the IDP/SP interaction data to the data scanner in the MDIS. This provides real-time verification in a post-deployment situation The certification of the moved SP or IDP is performed against customers' business, compliance, standards, and/or technology criteria.

FIG. 6A is a diagram showing one embodiment of message paths which may be traced. This shows the various phases of deployment. In the first phase, the customer-partner interoperability scenarios are deployed in a controlled environment, at least partly at a controlled facility. A variety of topologies are possible, with components deployed at the MDIS server, the customer and the partner.

A given Pilot Hosting & Testing iteration may involve several topologies. For example, an initial federation topology would site both identity provider and service provider at the server. Successful testing would lead to a second topology of the identity provider at the server and the service provider at the partner. In one embodiment, in hosting as well as production, the same company and even the same server may provide the IDP and SP functionalities. Pilot Hosting & Testing in one embodiment includes at least some of the following activities:

Protocol Implementation Test—are the messages being exchanged conformant to the relevant specifications?
    Product-to-Product Testing—do the selected products successfully interoperate?
    Customer Data Integration—for the federation use case, this might include business, compliance, and/or technical aspects
    Trust Metadata—does the metadata exchanged between IDP and SP providers establish the expected trust model and the identity assurance levels?
    Attributes—are the correct data being passed from the identity provider to the service provider?

Authentication—is the identity provider authenticating the user according to the service provider's request? For example, the service provider might stipulate that access to a particular function requires smartcard authentication.

Threat Injection—do the products behave appropriately in the face of threats such as tampering with signed data, messages outside their time constraints etc.

Policy-Specific Testing—in a federation context this might include verifying that, for a given principal, different name identifiers are generated for each linked service provider.

The architectural building blocks that in one embodiment make up the MDIS platform are shown in FIG. 7A, and listed in the table below:

| MDIS Component | Functionality |
| --- | --- |
| MDIS Validation Engine | Run time engine to validate federated data against a set of rules that make up a deployment profile. |
| MDIS Data Capture | Component that intercepts, decrypts, parses and assembles the federation traffic based on the federation protocol. |
| MDIS Deployment profile library | A wealth of generic and industry segment specific deployment criteria. |
| MDIS Portal | A user interface that allows access to the MDIS services and user administration services. |

FIG. 7A illustrates one embodiment of the high level extensible architecture of the MDIS platform depicting the various service offerings:

In one embodiment, the MDIS platform includes business/compliance criteria based on-demand services platform which is Identity and Access Management (IAM) vendor agnostic, identity protocols agnostic and hence provides a neutral platform for "pre-production" federation deployment services that extend beyond product level conformances. In one embodiment, the MDIS platform offers a library of pre-built deployment profiles that are both industry segment specific and generic across industry segments. MDIS platform is designed to work with identity federation and web services specifications like SAML, ID-WSF, WS-Federation, WS* and XACML; as well still emerging efforts such as OpenID 2.0, and OAuth.

In addition to providing access to pre-built deployment profiles, in one embodiment, the platform can also be used to develop and test custom federation scenarios to suit the specific requirements of a business within a given industry segment.

The MDIS architecture offers a single unified framework to, in one embodiment:
 Create & manage deployment profiles,
 Configure & test federation scenarios against the deployment profiles, and
 Generate reports based on the results of the deployment verification testing, highlighting interoperability issues.

In one embodiment, the deployment profiles are modeled as XML based rules that can be processed at runtime by the MDIS Validation Engine for performing the validation of the actual federation data against the rules defined in the deployment profile.

In one embodiment, the MDIS platform has a Data Capture component that captures all the identity federation traffic flowing between an Identity Provider (IDP) and a Service Provider (SP). In one embodiment, Data Capture component further decrypts the messages using the associated cryptographic keys, parses the federation protocol specific messages and feeds it into the MDIS rules engine for validation.

In one embodiment, a web portal (hence forth referred to as MDIS portal) is an interface for businesses to access and interact with the MDIS federation services. This interface may be used to set rules, as will be discussed later.

In one embodiment, the MDIS platform is built on an extensible architecture that lends itself easily to plug in other federation services such as compliance management, identity intermediary and monitoring. In one embodiment, the MDIS architecture is built to support one or more of the various federation artifacts such as Trust meta-data, Privacy, Encryption/Security, and Attribute Data Exchange.

FIG. 7B is a diagram showing one embodiment of a system in production. The identity provider and service provider communicate with each other. The MDIS data capture component receives the data in the communication stream. In one embodiment, the data is encrypted, and the data capture component decrypts the data, parses it, and assembles it. The parsed and assembled data is then passed to the validation engine.

The validation engine analyzes the data, using the deployment profile and determines whether the interaction is appropriate. In one embodiment, in addition to testing for validity, the validation engine also ensures compliance with requirements.

The results of this validation are stored as validation reports. Validation reports may be accessed by authorized users through the MDIS portal.

FIG. 7C is a diagram of one embodiment of a MDIS Validation Framework Architecture. As mentioned earlier, the validation framework is one embodiment of the system which may provide services. The validation framework is made up of the following building blocks:
 Configuration & Setup module
 Federation Data capture module
 Federation Data analysis module
 Report generation module FIG. 8A is a block diagram of one embodiment of the framework elements. The MDIS platform, in one embodiment, is deployed on a multi-tenant hosting infrastructure (VDC or "Virtual Data Center"). This allows multiple customer environments to be hosted in virtualized domains within the managed data center while ensuring the security and privacy of each customer and their data. Each customer may utilize one or more environments within the VDC. The Virtual Data Center allows transparent resource allocation and workload redistribution across physical servers to optimize the utilization and availability of physical computing resources without customers experiencing downtime or delay. In one embodiment, the MDIS platform is an enterprise-class, pre-production environment and provides reliability, availability, service continuity and disaster recovery in one embodiment.

In one embodiment, the virtual environment includes a domain name server (DNS). The DNS may be a split DNS. In one embodiment, the virtual environment may also include a Lightweight Directory Access Protocol (LDAP) store, an Active Directory, a relational database, or another store which stores user credential data.

In one embodiment, the MDIS platform may also be available as a packaged install for hosting in the customer's data center as well.

The MDIS platform, in one embodiment, can provide one-off integration, a hosted environment supporting testing/certification and value-added services, and the consumer services platform addressing future needs of identity protection and user-centric identity management. There are five components to the platform, in one embodiment.
Internet Portal
Content and Configuration Repository
Deployment Sandbox
Adapters and Libraries
Verification and Testing Tools
Automated certification, monitoring
Alerting
Routing
Translation of tokens for federated identity related interactions between multi-domain IDM systems.

In one embodiment, the system may further include automated certification, monitoring, alerting, routing, translation of tokens for federated identity related interactions between multi-domain identity management systems.

The internet portal provides secure remote access to service providers, partners and vendors. In one embodiment, the secure access may be provided via SSL VPN and web portal utilizing role-based access control. Once authenticated, users may access customizable content (templates, cookbooks, policies, questionnaires), review progress and run reports against data from testing and certification activities, and deploy IAM vendor solutions to their deployment sandbox.

The configuration repository stores common vendor configurations and test applications as well as custom configurations and applications for specific providers. Also deployed in the sandbox are specially developed adapters and libraries that enable specific integration or translation scenarios used in deployment environments. The libraries, for example, may include a Salesforce.com or .NET integration toolkit.

FIG. 8B is a block diagram showing one embodiment of an MDIS solution which simulates the customer's IDM environment as well as their partner IDM. As can be seen, the MDIS solution provides set of tools to enable certification of partner federations. Certification may include, in one embodiment, network monitoring, capture, correlated logging, auditing and configuration management.

FIG. 9A is a block diagram of one embodiment of the configured virtual machine and VLAN architecture. Effective use of virtualization technology reduces the hardware and network resources required to support large number of customers simultaneously.

Each customer (typically a hub in a federation network) is setup as a virtual local area network (VLAN) within MDIS. In one embodiment, there are many virtual machines within the VLAN. Each of the virtual machines has appropriate identity management technologies installed on them. The VLAN network topology is representative of the federation network of the hub customer both in terms of network topology (including DNS setup) as well as user schema elements (generally stored in LDAP or RDBMS).

A virtual hub is setup for each customer, in one embodiment. The virtual hub duplicates the customers Identity & Access Management (IAM) infrastructure as it relates to federation or web-services security.

When a customer signs-on to the portal, if this is the first time, the system will present an option to setup a virtual hub for the customer. Depending on the role of the customer in a federation deployment, the system will present options to setup an IdP, SP, or a virtual hub that can act as both. Next the user is asked to choose the vendor technology to be used for the creation of the virtual hub. The vendor technologies are products from vendors such as CA, IBM, Oracle, Sun, etc. Also, the user is expected to provide network host DNS names as well as applicable schema to be used for federation.

In the case of web services, this may also include appliances such as DataPower and provisioning them appropriately within the MDIS network.

After choosing the vendor technology, the user in one embodiment submits the request to the system along with any additional specific requirements for this customer. The system then provisions the necessary configuration by performing the following—

Create a new VLAN on the Cisco Catalyst Switch. This is done by looking up at a database and determining which network ports are available and which are already used. From the unused pool of network ports, a group of pool of network ports is selected and allocated to the VLAN.

This new VLAN is then setup with appropriate network access rules to limit the access to this network by authorized users. The VLAN is then added to necessary routing rules within MDIS.

Next a pre-existing template of the vendor technology machine is used to instantiate a new virtual machine and added to this VLAN. If such a template does not exist, then a virtual machine with only the base O/S is created. The virtual machine is then populated with the vendor technology. The new virtual is machine is allocated the necessary hardware resources such as Memory, CPU power, and hard disk space.

In one embodiment, every VLAN within MDIS has its DNS server that is used to setup the requisite network topology. When the customer logs into the MDIS, split-DNS is used to simulate any partner network DNS name to test a federation transaction between the customers' network and simulated host. In one embodiment, the customer logs in over IP-SEC VPN (virtual private network).

Once the all the host machines are provisioned in the new VLAN and the network DNS names have been setup as well as vendor technology implementation configured, the VLAN is ready for MDIS validation engine testing and reporting. In one embodiment, an MDIS engine is installed on one of the machines in the network called the driver workstation along with its data capture and validation rules engine routines.

The MDIS portal interface allows customers access to their respective scenarios and enables them to execute tests on their customized scenario. The portal interface also includes in one embodiment an orchestration engine. The orchestration engine manages the start/stop of test scenario executions as well as storing the validation reports for each test run as history.

In one embodiment, the process is as follows. Upon login the user is presented with a list of available scenarios. These scenarios have been created earlier by creating the necessary VLAN infrastructure as described above.

The user picks a scenario to be validated and initiates the process by clicking on a start scenario link. In one embodiment, this can be done from the browser. In one embodiment the interface shown in FIG. 24 may be used to initiate this process. This action by the user sends a message to the orchestration engine to begin a scenario on the driver workstation.

The data capture process is started first (this is to ensure that the initial SSL 3.0/TLS 1.0 handshake between a client and server is captured to be able to decrypt the secure communication).

Next, either a browser instance or a simulated "User-Agent" is started on the remote driver workstation. The remote "User-Agent" is controlled by the orchestration engine to interact with the user on an as-required basis. For e.g. an authentication prompt at the IdP is captured at the "User-Agent" and relayed to the end user through the portal interface.

Once the scenario execution is complete, the user clicks on a Stop Scenario link which sends a message to the orchestration engine. The remote "User-Agent" is stopped and the data capture is also stopped.

The captured data is then parsed, decoded and decrypted to extract the message flows on the wire that occurred during the execution of the scenario. Next, the validation engine is run on the exchanged messages by applying the applicable validation rules template for that scenario.

The output of the validation engine is a Validation Report that is then stored in the Content Management system along with a database record. This database record stores the scenario run details such as—scenario ID, date and time of the run, validation result file location, etc.

Figure 9B:
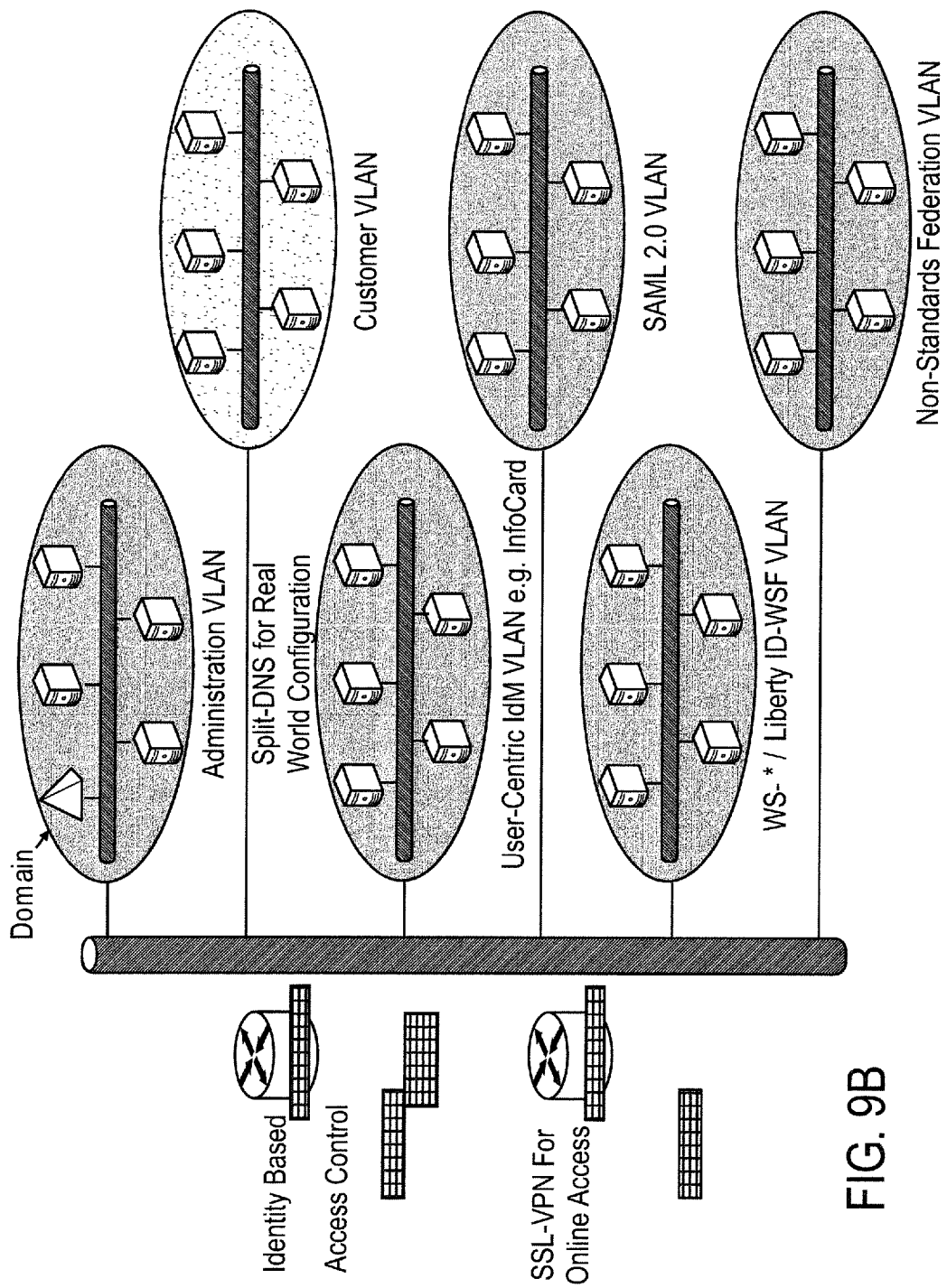
FIG. 9B illustrates the various VLAN logical architectures that may be utilized.

FIG. 9B illustrates the various VLAN logical architectures that may be utilized. In one embodiment the system may use Split-DNS for real-world configuration.

FIG. 10 illustrates one embodiment of a build scenario process. The build scenario starts with the physical servers (server 1 and 2) in this example. In one embodiment, the process increases capacity by virtualization and sets up virtual servers. The virtual servers, in one embodiment, may be hosted by one or more of the actual physical servers. The number of virtual servers created on a physical server, is only limited by bandwidth and storage requirements.

The process then installs scenario building software. In one embodiment, the scenario building software may include CA, FSS, IBM TFIM, Oracle Federated Identity Manager, and others. In one embodiment, the scenario building software may include all IAM services and federation services corresponding to the services which were requested by the customer for federation. In some cases, it could be an open source implementation or simulation of home grown federated identity implementation.

The process then configures the software to build the scenarios. The software is configured to reflect the actual federation requirements. In one embodiment, the scenarios include general scenarios (in one embodiment identical across multiple customer types), vertical specific scenarios (specific to the market of the customer), and specific scenarios (which are unique to the particular customer).

The process then tests the configuration and builds the actual scenarios. These scenarios built above are tested, verified, and validated prior to applying them to a QA environment. In this way, the system provides the ability to integrate existing scenarios with the customer-specific aspects that ensure that the customer's resulting IDP or SP meets all of the customer's specific requirements, as well as more general requirements.

Once a stable hosted system is deployed, the system may be used for demonstrations to the customer, partner and third parties. The output of the Pilot Hosting & Testing phase is a test plan for verifying that the real-world deployment matches the Deployment Profile, instructions for moving from the pilot to production ('customer staging and rollover') and cookbooks detailing product configuration, including screenshots where appropriate.

In one embodiment, the portal interface is run from common ports shared by all customers. In another embodiment, ports in the router are assigned to particular customers. In one embodiment, the port assignment is unique, during the deployment period when the customer's system is on the platform.

In one embodiment, the virtualization enables the system to instantiate each customer when they use are authenticated to log into the system, or when a query for that customer is received. This enables the implementation of a large number of customer systems, while using limited resources. By instantiating the portal, IDP/SP upon request/log-in, the system can maintain only those aspects that are currently being utilized by a client.

In one embodiment, whenever an interaction occurs with the IDP/SP, a snapshot is created of the system. The snapshot, in one embodiment, represents the features of the set-up, such that the particular configuration can be recreated. In one embodiment, the system maintains a timeline of frozen snapshot. In one embodiment, a separate snapshot is maintained for each instantiation. In another embodiment, a separate snapshot is maintained for each alteration of the set-up. By maintaining snapshots of the system, if there is a problem, a technician can easily determine what changes were made between a prior version and the problematic version. Furthermore, the customer may, in one embodiment, instantiate any previous version of the system, rather than having only a current version available for testing.

Figure 11:
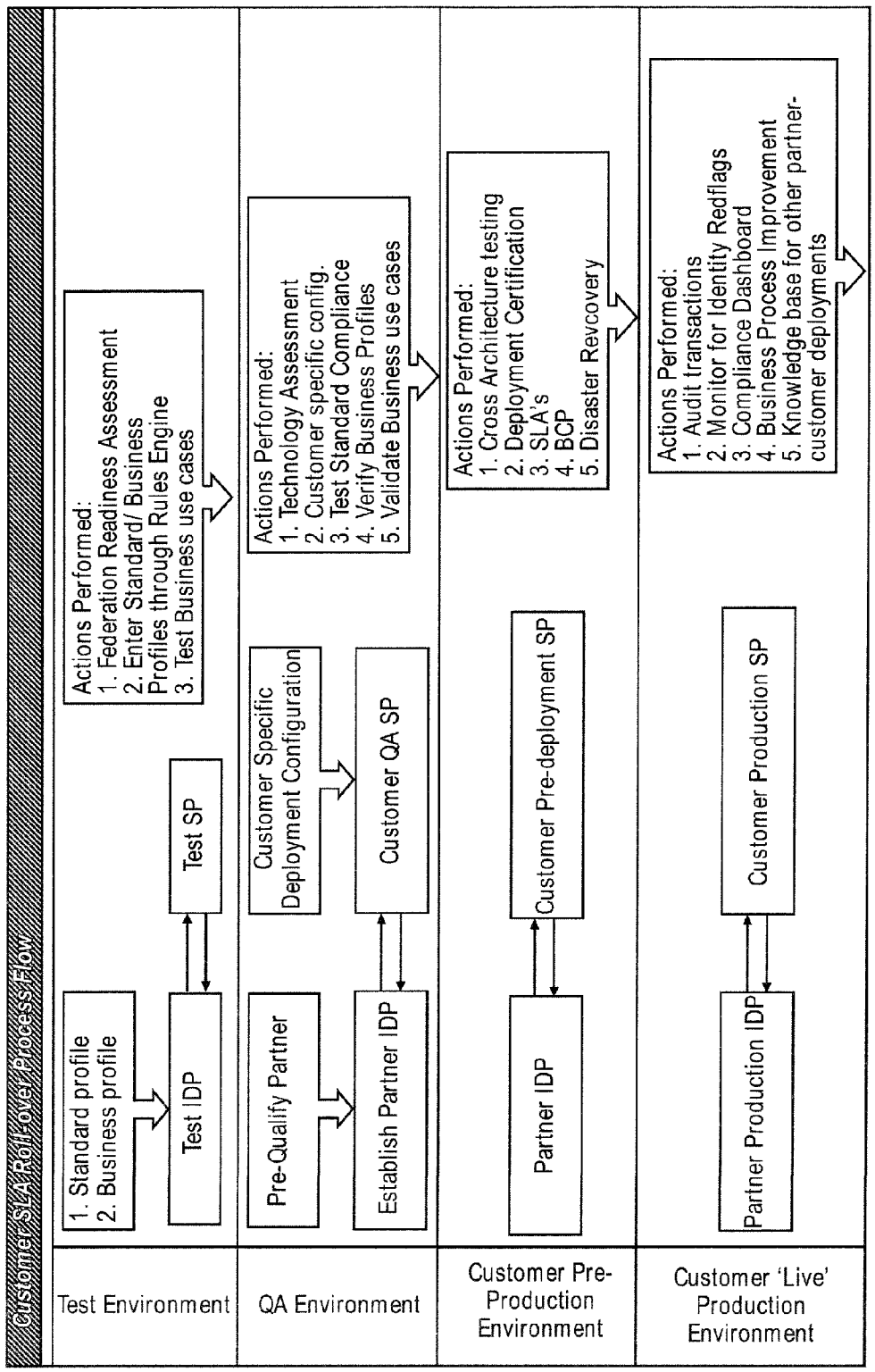
FIG. 11 is a process flow diagram of the customer SLA roll-over process.

FIG. 11 is a detailed chart illustrating one embodiment of the customer roll-over process.

When the process is initiated, in one embodiment when a customer first requests this process, a test environment is set up. The virtual Identity Hub and testing environment, in one embodiment, includes a test or virtual IDP and a test or virtual SP. In one embodiment, the test or virtual IDP/SP (whichever corresponds to the customer, which can include SP, IDP, or both) is set up based on a standard profile and specific business profile. In one embodiment, the process at the test environment stage includes readiness assessment, standard/business profile evaluation, and testing of business use cases. The readiness assessment includes, in one embodiment, evaluating whether the customer's use cases can be achieved, and whether the customer is ready to interact with the designated SPs/IDPs. In one embodiment, if the customer is not federation ready, remediation actions may be taken to make the customer ready.

The second stage is setting up a QA environment. In one embodiment the QA environment may be completely hosted within MDIS. In an alternative embodiment the QA environment may be hosted at the customer site. In this example, the SP is designated as the customer, and the IDP is designated as a partner with which the customer wishes to interface. It should be clear, however, that these situations could be reversed, and the IDP may be the partner.

In the QA environment, in one embodiment the set up includes a pre-qualified partner IDP and the customer QA SP. The customer QA SP is a customer-specific deployment configuration, in one embodiment. In another embodiment, this may be reversed, and a pre-qualified partner SP is tested with a customer QA IDP.

In the QA environment, one or more of the following tests are taken: technology assessment, determination of customer specific configuration and application of that configuration to the customer QA SP, testing for standards compliance, verification of business profiles, and validation of business use cases.

Next, the system is rolled to a customer pre-production environment. In this environment, the set-up includes a partner IDP and a pre-production version of the customer SP. This environment is used to perform cross-architecture testing. The environment may also be used to ensure that there is disaster recovery processes, that service level agreements (SLAs) and best common practices (BCPs) are in place. In one embodiment, deployment certification may also be performed using this set-up.

Finally, the system is rolled into a production environment. In the production environment, the customer SP and IDP interact in a normal fashion. In one embodiment, the MDIS system maintains a tap on the communications between the IDP and SP. In the production environment, in one embodiment, the MDIS can continue monitoring to identify non-compliance, and provide alerting and reporting. In one embodiment the monitored transactions may be securely archived to provide audit evidence. In one embodiment, the MDIS may further provide business process improvements based on observed interactions. In one embodiment, in addition to monitoring the customer SP to ensure that it continues to function properly, the MDIS also uses the data obtained from the production SP and its interactions as part of a knowledgebase for other partner-customer deployments, whilst still maintaining privacy.

In one embodiment, once the system is deployed in a "live environment" a heartbeat check is still maintained. A heartbeat check monitors the response of the system to a ping. In one embodiment, the heartbeat check may be maintained on all live deployments. In another embodiment, this may be the final phase of Q&A, in the live environment. The heartbeat monitoring may also be referred to as proactive monitoring or on-going deployment verification. By utilizing a heartbeat check, instead of taps, no customer installation is required. In one embodiment, a tap and a heartbeat check may be implemented concurrently. In one embodiment, the live deployment further incorporates an IDS (intrusion detection system) at the federation level.

In this way, the system provides a logical deployment roll-over from initial evaluation through production.

The pre-production environment is designed to simulate the "live" production environment. The example described here, the SP is the customer's SP, while the IDP is a partner IDP. As noted above, this relationship may be reversed without impacting the techniques described herein.

After the initial verification, and Q&A, the SP (or hub/client) is moved into client's own site. The client still communicates with the browser or partner behind the same wall, virtually. The customer accesses the system through a portal. The customer can interact with sandbox at each of the three positions (IDP, SP, or browser client) through a portal. Effectively, a virtual system is created in the portal. The partner, which is a third party only sees their applicable instance of IdP/SP as appropriate.

Once this stage is complete, the next stage is to move the browser to the local desktop of the client. The hub and the browser and therefore outside the virtual sandbox. In one embodiment, a split DNS system is implemented, to ensure all queries are directed to IDP inside the virtual machine/sandbox. In one embodiment, a tap system is added to the communication channel between the local router/firewall and portal. This ensures that even when production IDPs and SPs are used, the communications can be monitored.

In one embodiment, the system tests all traffic redirected to portal as the application is utilized. This enables close monitoring of the system. In one embodiment, the system further provides a logging associated with the partner IDP with which the pre-deployment SP is communicating. This type of correlated logging is useful to see how communications are received, whether all messages are properly handled, etc.

Figure 12:
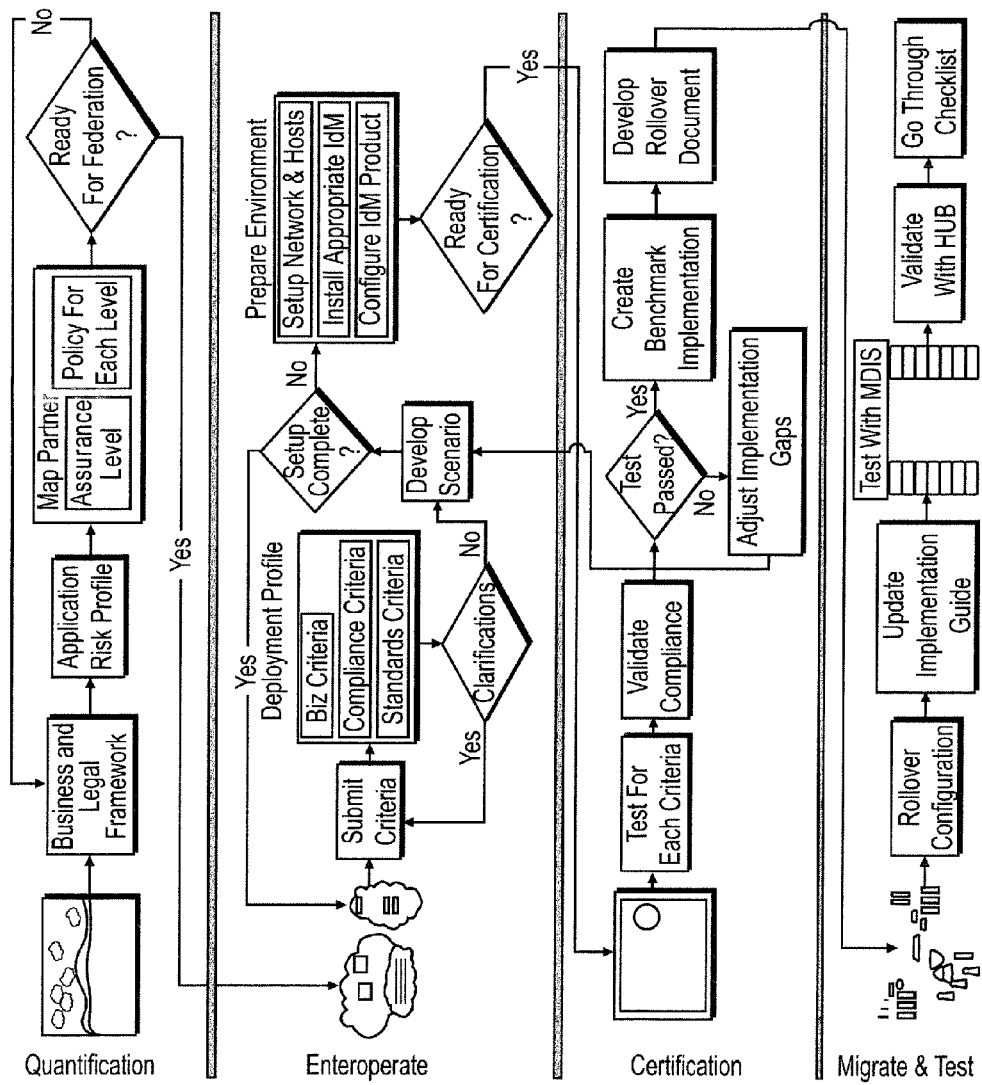
FIG. 12 illustrates an overview flowchart of partner on-boarding.

In one embodiment, the system provides partner on-boarding. FIG. 12 shows an exemplary flowchart of such a process. Once a particular customer's systems have been validated, further deployments are much faster. For example, if a hub has 50 partners, the process can be first used to work with a first spoke. MDIS provides templates for cookbooks, policy and legal framework guidelines, deployment best practices and guidelines and educational materials to speed up on-boarding and certification of partner federations. FIG. 12 illustrates an overview flowchart of partner on-boarding. The process starts with qualification, then moves to interoperation, and certification. The certification is based on business/compliance/policies/standards/technology criteria defined by the hub customer in the context of identity federation with the partner infrastructure. Once a partner is certified, the system is migrated and tested. This enables speedy addition of partners.

When the hub wants to add an additional spoke, the process of federation will be much faster, since the reusable units created for the first spoke will be able to be reused. In one embodiment, a hub can set up a set of steps to move from an initial proof of concept, pre-qualification of partners, through first deployments, and then add additional federated environments. In one embodiment, the addition of further spokes may be set up such that the logical expansion enables successively more reuse of previously validated configuration and data. As a $3^{rd}$ party support service for customers, Virtual Identity Hub model of MDIS establishes a repeatable on-boarding, certification and troubleshooting environment.

Figure 13:
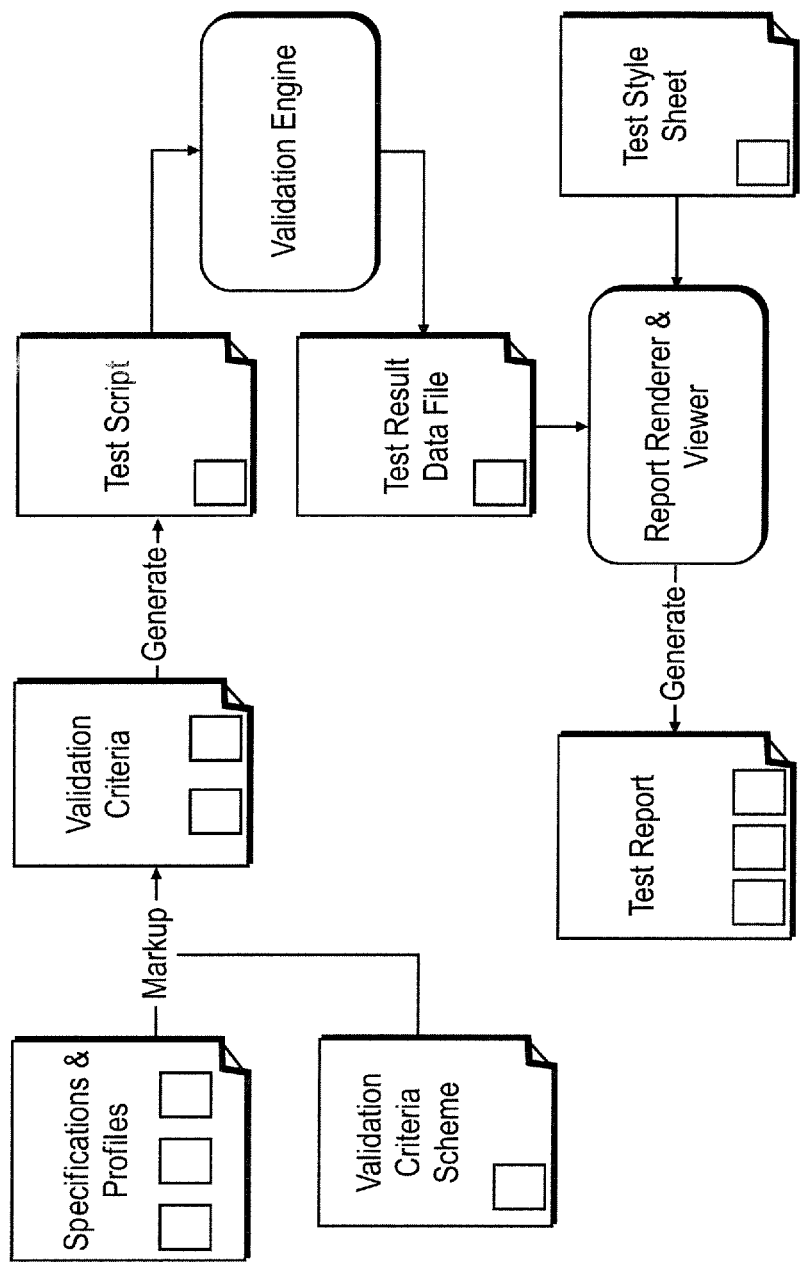
FIG. 13 is a flowchart of one embodiment of the implementation process.

FIG. 13 is a block diagram of one embodiment of the implementation process. In one embodiment, the process starts with creating Validation Criteria document based on Specifications or Profiles. The validation criteria document, in one embodiment, is a Word document containing XML markups following a defined validation criteria schema. The validation criteria are then fed to script generator to generate one or more test scripts. In one embodiment, a test script can be directly fed into Validation Engine. A Validation Engine runs validation scenarios, based on the test script, and collects data in a test result data file. In one embodiment, the data is collected in XML format. The test result data file is fed into a report renderer or viewer to generate human readable output. In one embodiment, the output is in HTML output using XSLT transformation. In one embodiment, the report can be further converted to Word document and/or PDF. The following list of documents may be involved in a validation process:

Specifications or profile. These are the validation requirement documents that define the validation criteria.
  a. Format: In various formats. Most commonly PDF, Word, or HTML.
  b. Audience: Human.

Validation Criteria. This document defines every aspect of the validation process—environment, atomic checks, use cases, and test steps, etc.
  a. Format: Word document with attached XML markups following defined schema.
  b. Audience: Human.

Test Script. This script is automatically generated from Validation Criteria document and can be provided to validation tool such as Validation Engine as input.
  a. Format: XML
  b. Audience: Machine (Validation Engine)

Test Result Data. This is an xml document that is automatically generated by validation tools. The data file contains references to test script items, however it doesn't contain verbose text contents.
  a. Format: XML
  b. Audience: Machine (For persistence and report viewer)

Test Report. The test report is generated by report viewer. Report viewer takes Test Result Data as input, supplement it with either embedded or referenced text explanation derived from Test Script and Validation Criteria. This is the final deliverable to the customer
  a. Format: HTML, Word, PDF etc.
  b. Audience: Human.

Figure 14:
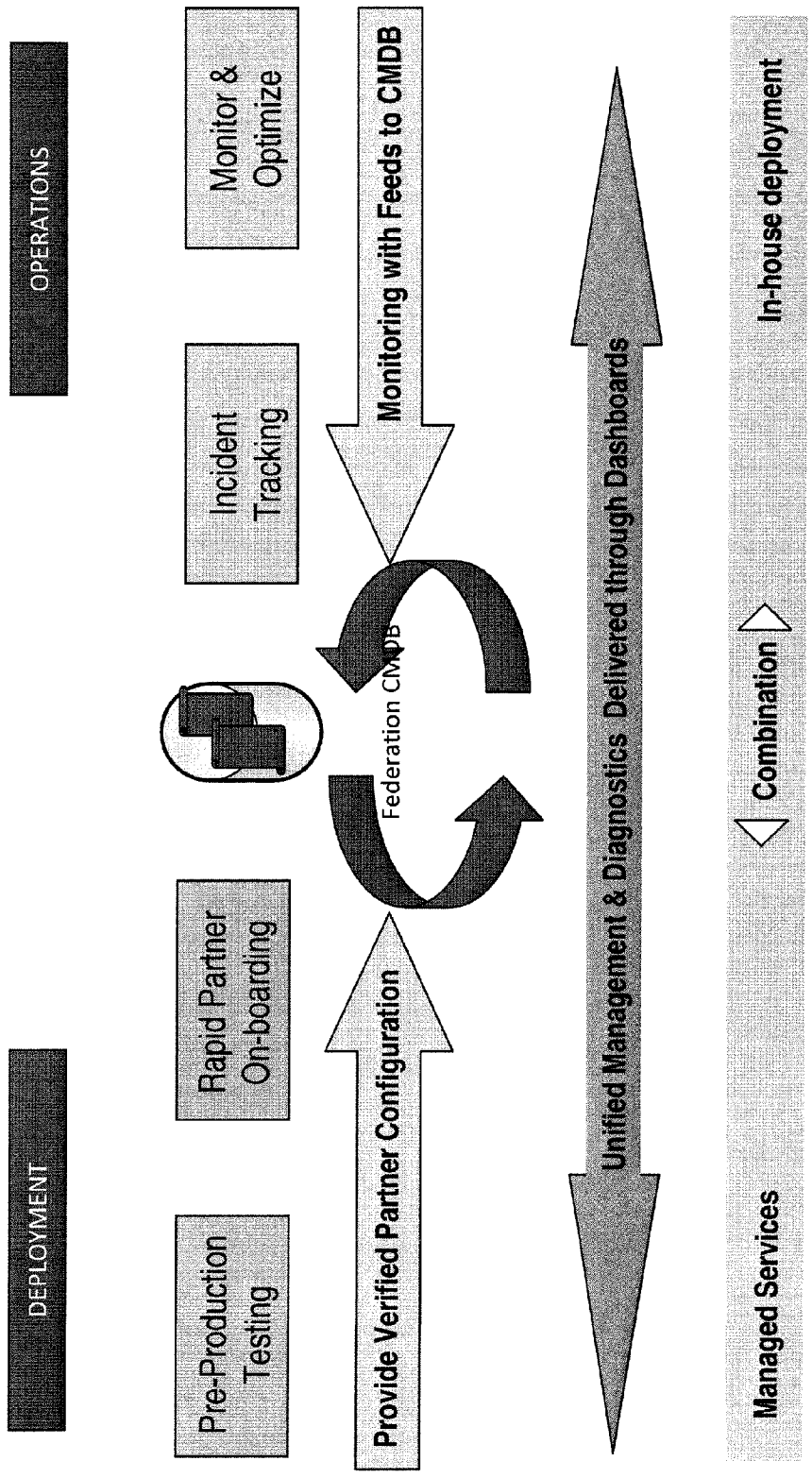
FIG. 14 illustrates one embodiment of the federation and web service life cycle management.

FIG. 14 illustrates one embodiment of the federation and web service life cycle management. As can be seen, the process moves from pre-production testing, to rapid partner on-boarding during deployment. Once deployment is complete, the process moves to operations. During operations, the client's system functions as normal. However, the system can provide monitoring, incident tracking, and optimization. In one embodiment, tracking is done with feeds to a configuration management database (CMDB). Throughout the process from initial pre-production through monitoring, a unified management and diagnostic can be delivered to the customer and the deployment service.

In one embodiment, the system provides a heartbeat monitor upon deployment. The heartbeat monitor, in one embodiment, includes pinging end-points periodically and recording the responses. The period for pings may be every few minutes/hours/days. In one embodiment, the ping is every hour during active times, and every 3 hours during non-active times. If the heartbeat ping receives no response, or an unacceptable response, an alert may be sent. The system may further generate reports as set up. These reports may include summary of up-time, usage summaries, etc. The reports may be automatically generated, as set up by an administrator. The automatically generated reports may be provided daily, weekly, and/or monthly. Various administrative contacts may receive reports at different frequencies.

Figure 15:
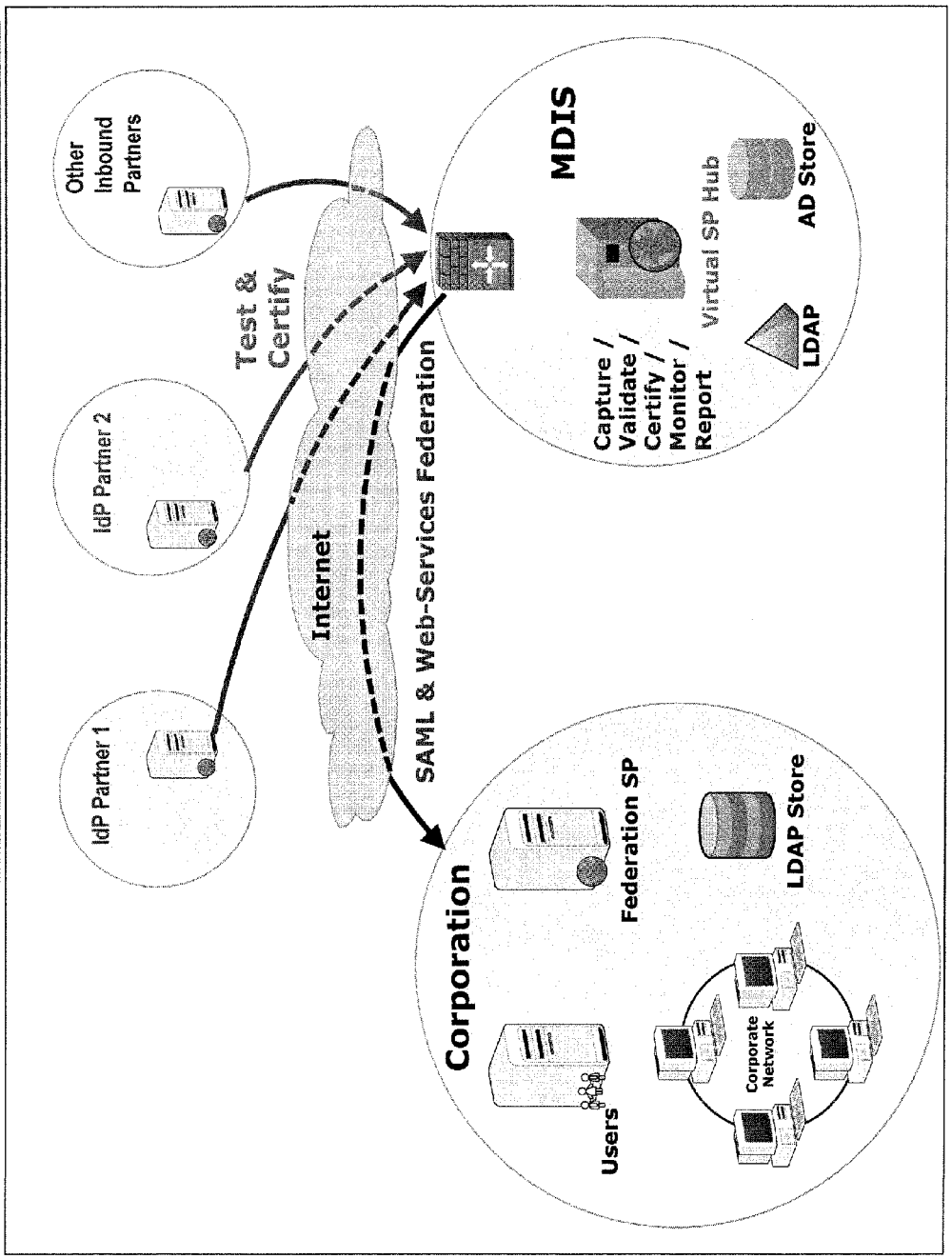
FIG. 15 is a diagram illustrating one embodiment of automated federation monitoring.

FIG. 15 is a diagram of one embodiment of automated federation monitoring. As can be seen, corporation wishes to utilize identity services (here SAML 2.0 and web-services federation, but any other identity management services may be used), to connect to IdP partners. Corporation connects through MDIS. MDIS provides a connection to tested and certified partners through a network. In one embodiment, the MDIS captures and validates interactions between corporation and partner IDPs. In one embodiment, MDIS further certifies and monitors the partner IDPs as well as the interactions. In one embodiment, MDIS further provides reporting. Reporting, in one embodiment, may be to the corporation/client.

Figure 16:
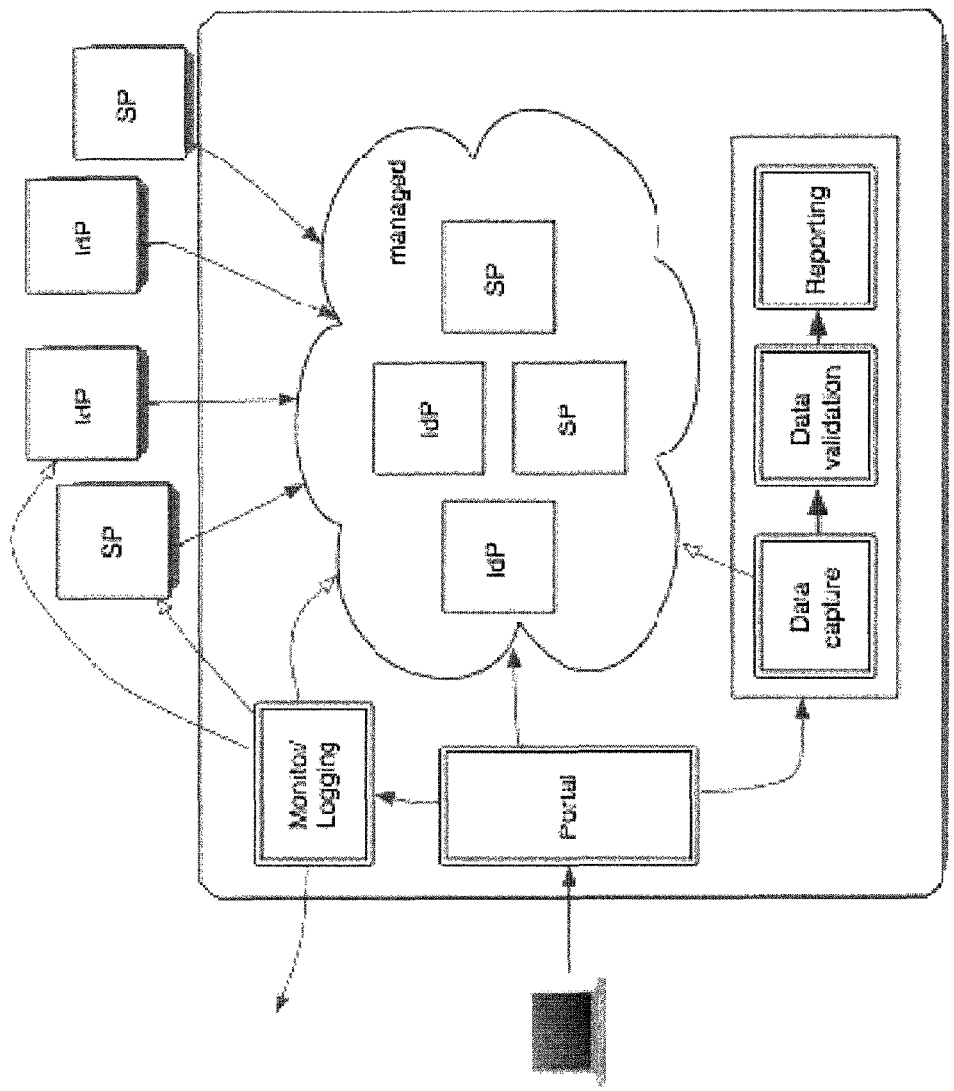
FIG. 16 is a block diagram of one embodiment of typical federation and MDIS services.
Figure 19:
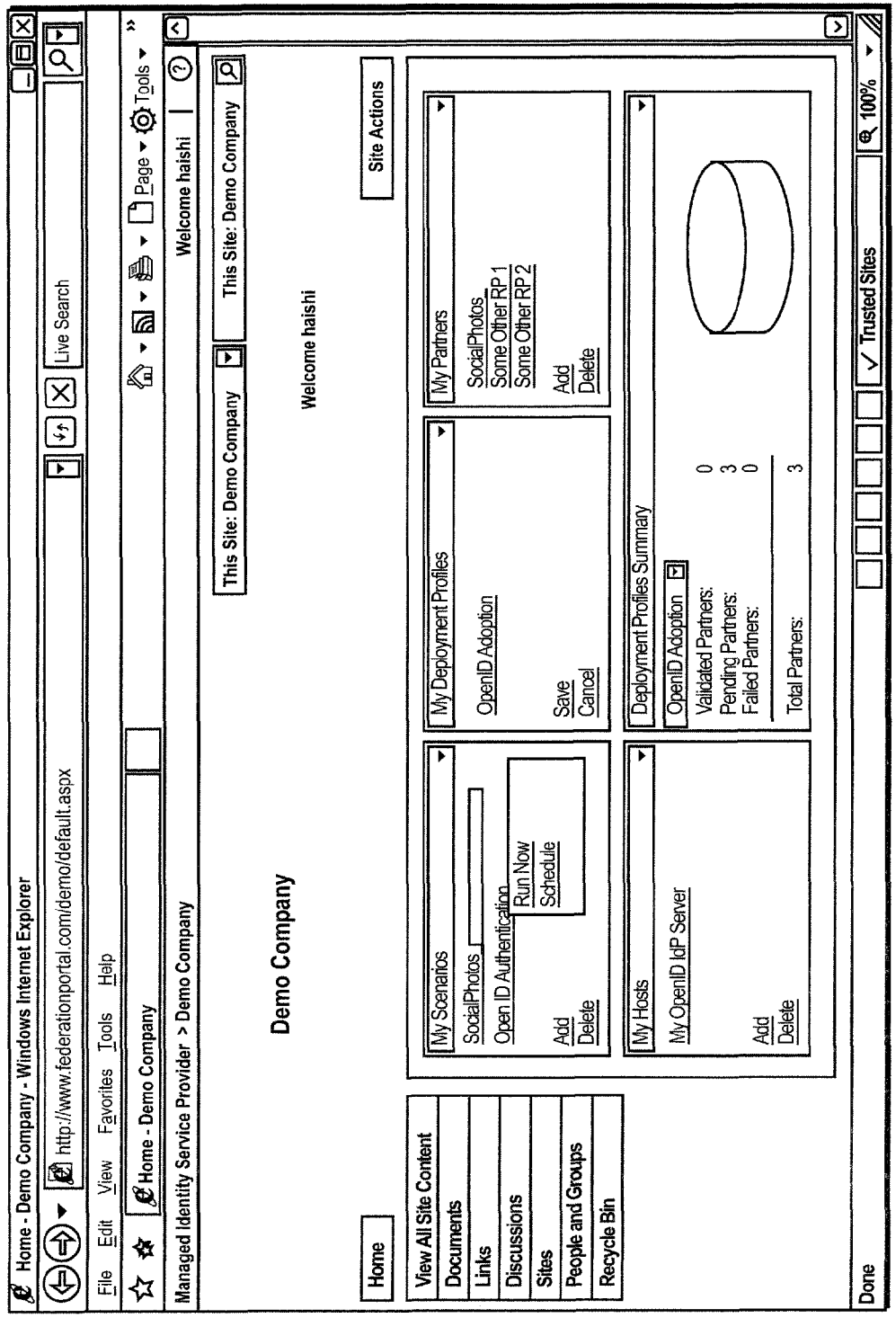
FIG. 19 is an exemplary user interface for a client.

FIG. 16 illustrates one configuration showing the typical federation and MDIS services. The customer logs in through a portal. FIG. 19 illustrates one embodiment of the portal which may be used by the client.

FIG. 19 is an exemplary user interface for a client. In one embodiment, a user signs into the portal using their login credentials and a web browser. In one embodiment, the portal supports federated login, as well as using any input device. Based on the user identity and associated role, the user has access to certain functionalities. In one embodiment, as can be seen in FIG. 19, the user may view and add scenarios, partners to qualify. The system in one embodiment also includes a report indicating the current status of partners (validated, pending, or failed), and live (external) partner certification.

Returning to FIG. 16, The MDIS system includes the portal, MDIS managed IdP's and/or SPs. The system further may include, in one embodiment external SPs and IdPs. These external SPs and IdPs are run, in one embodiment, by unrelated sites, and may be the SPs and IdPs that would be utilized by the customer during deployment. In one embodiment, communications between the managed IdPs and SPs and external IdPs and SPs, and the customer, are monitored and logged by monitor. In one embodiment, furthermore, the communications between the managed IdPs and/or SPs and the customer are fully captured and validated. This enables the system to ensure that the managed IdPs and SPs perform up to specification. Furthermore, in one embodiment the monitor and data capture may remain available after deployment. This would enable the MDIS services to provide further management after deployment.

In one embodiment, during set-up of the system, the MDIS sets up information for the endpoints being monitored (e.g. the external IdPs and SPs). The system may also be set up with various types of alters and notifications being sent to designated users. The designated users, in one embodiment, may be employees of the deployment service and/or the employees of the client, or both. The set-up further provides network access, to provide secure connectivity into the deployment system and the customer system for monitoring and reporting. In one embodiment, set-up is performed through a portal hub.

Figure 17:
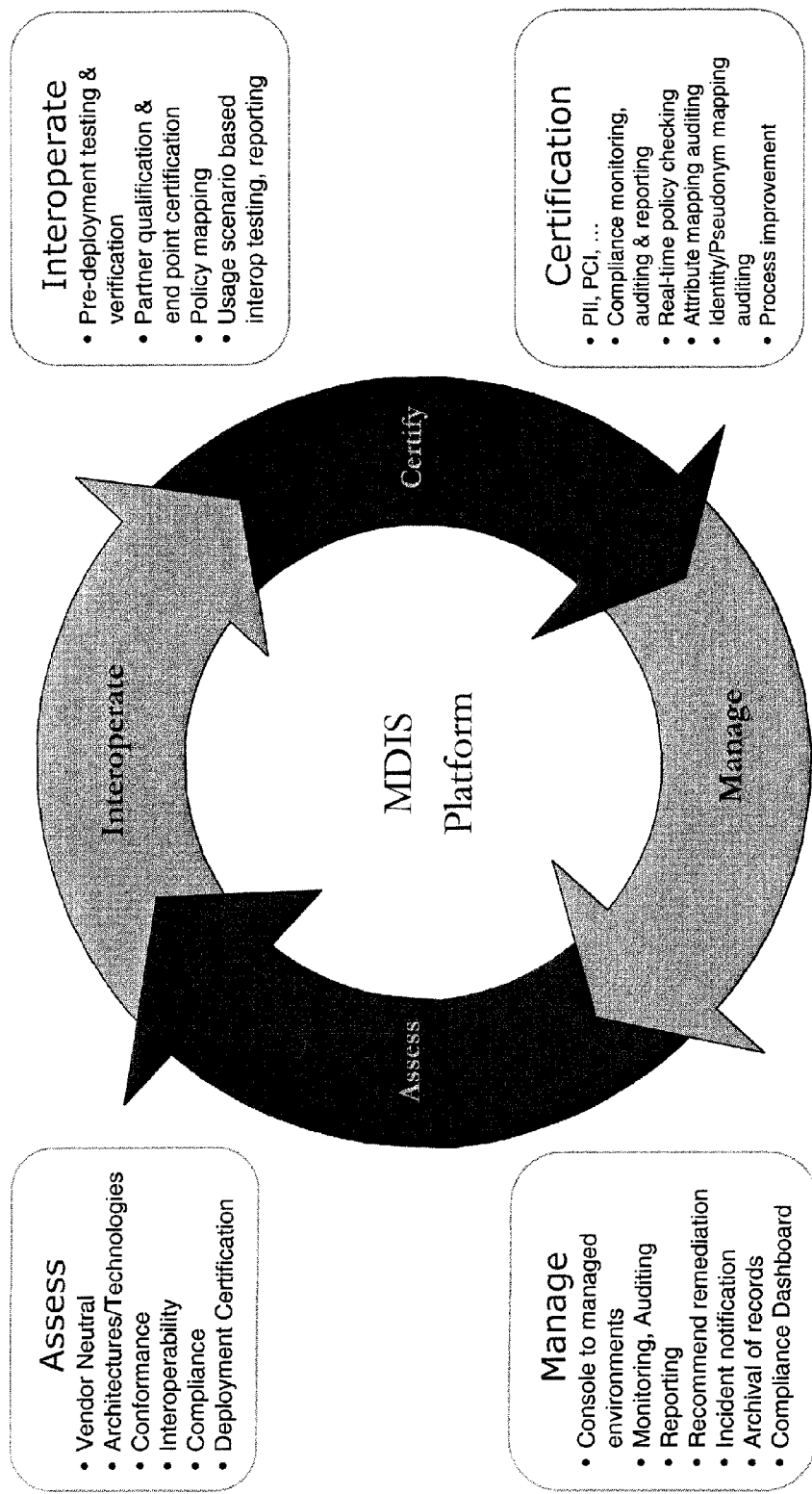
FIG. 17 is a summary of one embodiment of MDIS services.

FIG. 17 illustrates one embodiment of the suite of services which may be supported by the MDIS platform. The services provide the ability to assess, interoperate, comply with requirements, and manage the various aspects of federation.

Verification and testing tools provide a reusable framework and value-added tools for common pre-deployment testing/certification and debugging processes. These tools may include, for example, token interceptor/inspector, log aggregator, and tracing/debugging of federation scenarios. Additionally, in one embodiment, certification and testing tools can test and validate deployment architecture, including the following functionality:

identity data federation
  data integration
  security, encryption, threat injection, vulnerability testing
  network and DNS topology
  scalability, performance, availability & redundancy (SPAR)

In one embodiment, additional services related to a multi-tenant hosted service will also be supported—such as billing logic and usage tracking.

A user can access the MDIS over a number of protocols, in one embodiment. For example, in one embodiment using a web browser, the user can connect over HTTPS to connect and log into the customer specific MDIS portal internet address (e.g. customer.federationportal.com) and view any web accessible content or services. This includes static and dynamic web content as well as signed applets. Using a more secure SSL-VPN connection that requires a client SSL-VPN agent, in one embodiment the user can connect over other protocols, like SSH and SFTP and also connect via a web browser to real-world network addresses mirrored inside of MDIS environment using split-DNS.

The purpose of using split-DNS is to emulate DNS and network topology to ensure that the tested environment closely resembles the real world configuration.

The MDIS Portal is the entry point for users into the MDIS, in one embodiment. All user facing interfaces are exposed through the MDIS, either as web pages in the Portal or specialized protocol services like SSH and SFTP that are allowed via the Router firewall rules. In one embodiment, a .NET based SharePoint portal is utilized.

Based on the external web address the user entered from (e.g. customer.federationportal.com), in one embodiment, the user will be routed to that customer's VLAN for authentication. Once the user has been authenticated, the user will have access to the requested customer portal and the hosted scenarios in the customer Deployment Sandbox.

In one embodiment, the customer portal runs on a JBoss J2EE application and portal server and is personalized and branded for that customer. In one embodiment, the customer portal may be personalized and branded for the reseller, or service provider.

The portal, in one embodiment, supports standard portlet architecture and also enforces Role-Based Access Controls to control access to actions, scenarios, content and other repositories within the portal, based on one or more roles associated with the authenticated user. For example, a partner user account may only have access to a specific scenario and subset of content. In one embodiment, content is managed by an embedded Content Management System (CMS). In an alternative embodiment, content is managed by an external system. In one embodiment, the CMS used is Alfresco. In one embodiment, the reports are generated using Eclipse Foundation's Business Intelligence and Reporting Tools (BIRT).

In one embodiment, some users also have access to an Administration Server for approved administrators to manage and provision users and perform some portal configuration. In one embodiment, there is also a Grid Controller for authorized users. The Grid Controller enables deployment, rebalancing, and management of scenarios installed for that customer.

In one embodiment, customers can shutdown and restart their own scenarios from their portal, but they may not rebalance or create new scenarios. In one embodiment, the rebalancing and creating new scenarios is done through a Grid Controller Applet. In one embodiment, administrators (and resellers in some cases) have access to the Grid Controller Applet for configuring and deploying new scenarios. Alternative levels of control may be implemented. In one embodiment, the administrative set-up may provide role-based and individual permission-based access and controls.

In one embodiment, the data is stored in multi-tenant data repositories. The data repositories store and manage access to a variety of content. In one embodiment, a number of application services may be running in the portal that access the repositories. These include general CMS functionality as well as planning, reporting, workflow and issue management.

The primary data repositories include in one embodiment:
Content—may be Alfresco Content Management System
Scenario Descriptions—may be Alfresco Content Management System
Test Plans—may be Alfresco Content Management System
Test Data and Results—may be Splunk IT Data Search Engine
Issue Management
Log Data—may be Splunk IT Data Search Engine In one embodiment, the data in the repositories will be stored in a MySQL database. In one embodiment, some data may be stored in proprietary formats.

The Deployment Sandbox is where customer scenarios are deployed. The sandbox isolates one customer from another and may contain the entire deployment of the scenario. In one embodiment, the deployment of a scenario is implemented on a virtual LAN. In one embodiment, applications are automatically configured as virtual appliances containing the full operating system and all software necessary, which are installed and configured correctly on available hardware. Virtual Appliances in one embodiment may run on the XEN or VmWare Hypervisor and deployed through the 3Tera Applogic Grid Operating System. In one embodiment, hardware is shared and load balanced between multiple VLANS and customer sandboxes. In another embodiment, hardware is dedicated per customer sandbox by the Grid Controller. Any specialized hardware required by the client is, in one embodiment, configured and deployed within a sandbox.

The Adapters and Libraries provide the necessary hooks into the deployed applications, such as virtual appliances and the Certification and Testing Tools. The adapters, in one embodiment, also provide hooks into externally hosted infrastructure and services, (Salesforce.com or a GSA Testing Lab for example).

The MDIS, in one embodiment, has a plethora of tools and services for supporting certification and testing. These may include Data Generators, Protocol Interceptors, Token Inspectors, Data Collectors, and Threat Injectors. There is also an XML Test Harness that sets up the necessary tools and services, drives execution of configured tests against the Deployment Sandbox and records the results.

The Virtual Data Center, in one embodiment, is a deployed instance of the 3Tera Applogic Grid Operating System. The virtual data center in one embodiment includes a Grid Controller, Global Volume Store, Virtual Appliance Repository and Assemblies. The Grid Controller supports configuration, deployment and management of the Deployment Sandboxes through a web applet. Application binaries and Data are stored in the Global Volume Store and accessed by the Grid.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method of providing identity federation deployment comprising:
utilizing a pre-generated schema stored in a memory of a computer system for generating a deployment system including a deployment profile for interoperability between two or more service providers (SP) and/or identity providers (IDP) (SP/IDPs);
providing a validation environment, the validation environment comprising one or more virtual SP/IDPs implemented on one or more computer systems, the virtual SP/IDP representing a customer configuration, the virtual SP/IDP to interact with a third party pre-production partner SP/IDP on a remote computer system through standard interaction methods, to validate that the virtual SP/IDPs are capable of interoperation at the deployment level with the third party pre-production SP/IDPs; and
creating a customized quality assurance environment on a server to continuously monitor compliance of a live customer federation hub with the pre-generated schema, the quality assurance environment to monitor the interfacing of at least one live customer endpoint and a live third party SP or IDP, wherein monitoring the interfacing of the at least one live customer endpoint and the live third party SP or IDP comprises decrypting, parsing, and assembling an identity-related communication between the SP and the IDP.

2. The method of claim 1, wherein the schema is one of:
the SP is a client, and the SP is designed to interface with one or more IDPs; and
the IDP is the client and designed to interface with one or more SPs.

3. The method of claim 1, further comprising:
rolling out the quality assurance environment to a pre-production environment.

4. The method of claim 3, wherein the pre production version of the SP/IDP is a service provider client.

5. The method of claim 3, further comprising:
rolling out a live customer environment in which a fully deployed version of an SP interface with a fully deployed version of the IDP; and providing a tap to monitor communications between the SP and the IDP, in the live customer environment, thereby providing the continuous compliance monitoring.

6. The method of claim 5, wherein monitoring communications between the SP and the IDP comprises:
validating the identity-related communication.

7. The method of claim 6, wherein validating the identity-related communication comprises comparing the monitored communication to the deployment profile; and
generating a validation report.

8. The method of claim 1, further comprising:
providing an automated endpoint validation and independent real-time certification service for technical implementation conformance, allowing a customer to perform partner federation on-boarding and compliance certification for any protocol.

9. The method of claim 8, wherein the protocols may include one or more of Security Assertion Markup Language (SAML), WS-Federation, WS-*, OpenID, OAuth, OpenID Connect, and Identity Federation protocols.

10. The method of claim 8, wherein the federation and compliance certification is further independent of one or more of authentication formats, policies, privacy regulatory requirements, security models, trust domains, business rules, and identity management (IDM) implementations.

11. The method of claim 1, further comprising:
providing an extra endpoint, the endpoint one of an Identity Provider (IDP), Service Provider (SP), or Relying Party (RP), in the live customer federation hub to capture and validate tokens, encryption, assurance levels, claims, and attributes allowing new entities to join the federation in a customer hub setup.

12. The method of claim 1, further comprising:
providing ID assurance verification services.

13. The method of claim 1, wherein the process further comprises:
on-boarding the customer to a second federation, wherein the second federation has a different set of requirements from the first federation, the on-boarding including setting up a configuration which enables the customer to interact with the first federation and the second federation.

14. The method of claim 1, further comprising:
setting up a hosted federation routing and translation service for the federation partner on-boarding.

15. The method of claim 1, wherein the SPs and IDPs are set up in the form of one of: hub and spoke, point-to-point, many-to-many, and one-to-many configurations.

16. The method of claim 15, wherein the form is replicated as a virtual implementation, such that all entities in the virtual hub and spoke elements are used for validation.

17. A deployment system to enable deployment of a compliant federation hub, the system comprising:
a pre-generated schema stored in memory, to generate a deployment system including a deployment profile for interoperability between two or more service providers (SPs) and/or identity providers (IDPs) (SP/IDP);
a validation environment, including a virtual SP/IDP representing a customer configuration, the virtual SP/IDP to interact with a pre-production third-party partner endpoint implemented on a computer system, to validate that the customer configuration is capable of interoperation with the third-party partner endpoint;
a deployment environment implemented on a server, including customized quality assurance to continuously monitor compliance of the live endpoints in the customer federation with the pre-generated schema, by monitoring communications, wherein monitoring the communications comprises decrypting, parsing, and assembling an identity-related communication between the SP and the IDP.

18. The system of claim 17, wherein the monitoring of the communications comprises a tap within the live endpoint, to obtain copies of communications.

19. The system of claim 18, wherein the tap further decrypts, parses, and assembles identity-related communication between the end points, to monitor compliance.

20. The system of claim 17, wherein the monitoring comprises an extra endpoint within the quality assurance environment of the live federation hub, the extra end point interacting with the live endpoints in the federation, to monitor compliance based on the interactions.

* * * * *